(12) United States Patent
Yunoki

(10) Patent No.: US 7,495,686 B2
(45) Date of Patent: Feb. 24, 2009

(54) PORTABLE CELLULAR PHONE HAVING CAPABILITY OF RECEIVING TV BROADCAST, AND TV BROADCAST RECORD SETTING SYSTEM AND METHOD FOR SAME

(75) Inventor: Kazuyuki Yunoki, Tokyo (JP)

(73) Assignee: NEC Corporation, Tokyo (JP)

( * ) Notice: Subject to any disclaimer, the term of this patent is extended or adjusted under 35 U.S.C. 154(b) by 626 days.

(21) Appl. No.: 11/006,749

(22) Filed: Dec. 8, 2004

(65) Prior Publication Data

US 2005/0122435 A1 Jun. 9, 2005

(30) Foreign Application Priority Data

Dec. 9, 2003 (JP) ............................. 2003-410152

(51) Int. Cl.
*H04N 7/14* (2006.01)
*H04H 20/71* (2008.01)

(52) U.S. Cl. ............... 348/14.01; 348/14.02; 348/14.03

(58) Field of Classification Search .............. 348/14.01, 348/14.09; 379/102.03, 88.13, 70, 88.17, 379/88.23; 386/83, 95, 46; 455/3.01
See application file for complete search history.

(56) References Cited

U.S. PATENT DOCUMENTS

| | | | | |
|---|---|---|---|---|
| 5,303,396 | A * | 4/1994 | Ooyagi et al. ................ 455/134 |
| 6,510,209 | B1 * | 1/2003 | Cannon et al. ............ 379/88.13 |
| 6,574,461 | B1 * | 6/2003 | Skold ....................... 455/277.2 |
| 6,731,727 | B2 * | 5/2004 | Corbett et al. ............ 379/93.35 |
| 6,968,206 | B1 * | 11/2005 | Whitsey-Anderson ... 455/556.1 |
| 6,971,109 | B1 * | 11/2005 | Williams et al. ............. 719/318 |
| 7,212,729 | B2 * | 5/2007 | Nakajima et al. .............. 386/83 |
| 2002/0140635 | A1 * | 10/2002 | Saitou et al. ................... 345/30 |
| 2002/0168177 | A1 * | 11/2002 | Kajitani ........................ 386/83 |
| 2004/0052504 | A1 * | 3/2004 | Yamada et al. ................. 386/68 |

FOREIGN PATENT DOCUMENTS

| | | | |
|---|---|---|---|
| GB | 2388455 A | * | 11/2003 |
| JP | 409186981 A | * | 7/1997 |
| JP | 2003-37799 A | | 2/2003 |
| JP | 2003-163748 A | | 6/2003 |
| JP | 2003-188952 A | | 7/2003 |
| JP | 2003-204498 A | | 7/2003 |
| JP | 2003-283972 | * | 10/2003 |

\* cited by examiner

*Primary Examiner*—Melur Ramakrishnaiah
(74) *Attorney, Agent, or Firm*—Sughrue Mion, PLLC

(57) ABSTRACT

A portable cellular phone is provided which is capable of recording a TV (Television) broadcast by remote control even when the portable cellular phone is not kept at hand, a method for setting the portable cellular phone to record the TV program, and a system of operating the portable cellular phone. A user having forgotten to bring the portable cellular phone and keeping no portable cellular phone at hand originates a call to the portable cellular phone by using a telephone over a network and via a wireless communication base station. The portable cellular phone can perform automatic unattended record processing to automatically answer the call. While being automatically answered, a state of the portable cellular phone is changed to a record setting mode when a specified dial key of the telephone is pushed. In the record setting mode, by pushing a dial key of the telephone, the portable cellular phone is set to record the TV broadcast.

28 Claims, 14 Drawing Sheets

PORTABLE CELLULAR PHONE HAVING CAPABILITY OF RECEIVING TV BROADCAST, AND TV BROADCAST RECORD SETTING SYSTEM AND METHOD FOR SAME

BACKGROUND OF THE INVENTION

1. Field of the Invention

The present invention relates to a portable cellular phone having capability of receiving a TV (television) broadcast, and a TV broadcast record setting system and a method for same, and more particularly to the portable cellular phone being capable of receiving and recording the TV broadcast by operating and controlling from a remote site over a radio channel, and the TV broadcast record setting system and the method for same.

The present application claims priority of Japanese Patent Application No. 2003-410152 filed on Dec. 9, 2003, which is hereby incorporated by reference.

2. Description of the Related Art

A portable cellular phone was originally designed for telephone communication. However, at present, besides the telephone communication, various applications have been proposed and realized. Portable cellular phones that can perform capabilities of operating electronic mail (E-mail), connecting to the Internet, executing Java (registered trademark) applications, reproducing music, using a GPS (Global Positioning System), handling electronic money, serving as a digital camera and digital video recorder, or a like are being manufactured and marketed. The portable cellular phone, which can perform such the above capabilities each having been originally realized in a form of a different device, seems to serve as a multimedia rather than a telephone. Moreover, an attempt to install a capability of receiving a TV broadcast on a portable cellular phone is already started.

Users of the portable cellular phone have long hoped that the portable cellular phone has a capability of receiving the TV broadcast. However, unlike the capability of serving as a digital camera or operating E-mail, for such the portable cellular phone to perform the capability of receiving the TV broadcast, driving of circuits in the portable cellular phone have to be continued while the portable cellular phone is receiving the TV broadcast, for example, for thirty minutes or one hour and, in some cases, for a time as long as several hours. However, the portable cellular phone is generally driven by a battery and, therefore, an amount of power that can be consumed is limited. As a result, to install additional capabilities on the portable cellular phone, reduction of power being consumed by circuits making up the portable cellular phone is of importance. Furthermore, the portable cellular phone is rapidly made small-sized, light-weight and thin and, therefore, miniaturization of components making up the portable cellular phone is also vital to the installation of such the capability of receiving the TV broadcast with the portable cellular phone.

Due to such reasons as above, the installation of the capability of receiving the TV broadcast on the portable cellular phone has been delayed when compared with the installation of the capability of serving as a camera in which long continuous operations of circuits in the portable cellular phone are not required.

However, since a progress in the miniaturization of components and reduction of power being consumed by circuits making up the portable cellular phone are remarkable in recent years, the above problems are now being solved and, therefore, the installation of the capability of receiving the TV broadcast on the portable cellular phone is being realized.

Simultaneous installation of capabilities of receiving the TV broadcast and recording the TV broadcast on the portable cellular phone affords more convenience to users. Users, when having the portable cellular phone with such capabilities, can get pleasure from the TV broadcast and can record the TV broadcast, when necessary, with a touch of its button.

Even when the user cannot use the portable cellular phone due to a reason that the user is in a conference room or concert hall while a desired TV program is being broadcast or to other reasons, the user can preset the portable cellular phone to record the TV program.

However, since the portable cellular phone can take it with the user, there is a case in which a user forgets to bring the portable cellular phone to a place where the user is staying. In that case, the user cannot operate the portable cellular phone with the touch of its button and, as a result, cannot preset the portable cellular phone to record the TV broadcast.

On the other hand, the portable cellular phone has a communication capability. Therefore, even when the user happens not to keep the portable cellular phone at hand, if the user can remotely operate the portable cellular phone from outside using the communication capability, it can afford convenience to the user as well.

At present, various types of technologies to remotely operate not only the portable cellular phone but also a device having a capability of receiving or recording the TV broadcast or their related technologies are proposed. For example, the following technologies are disclosed.

Technology is disclosed in Japanese Patent Application Laid-open No. 2003-188952 in which a home video recorder is preset to record a program by giving an instruction from a terminal to a server connected to a network (called "first technology"). According to the above technology, even when the user cannot operate the home video recorder since the user is now out, the user can remotely operate the home video recorder from outside via the server connected to the Internet.

Another technology is disclosed in Japanese Application Laid-open No. 2003-204498 in which, by providing an instruction to a home terminal adapter being connected to a network, the home video recorder is preset to record a program via an infrared terminal connected to the home terminal adapter (called "second technology"). In general, the home video recorder can be operated by an infrared terminal in many cases. This is useful as technology which enables existing devices to be remotely controlled by making the infrared terminal be connected to the network.

Still another technology is disclosed in Japanese Application Laid-open No. 2003-63748 in which a computer having capabilities of receiving and recording the TV broadcast being connected to a network is preset to record a program through a telephone line (called "third technology").

This is useful as technology which enables remote control, even at system shutdown, via a network interface section in the computer.

Still another technology is disclosed in Japanese Application Laid-open No. 2003-37799 in which, when a predetermined time comes, an instruction to turn a power source ON or OFF is provided, over a network, to a portable communication device having a capability of receiving the TV broadcast (called "fourth technology"). This technology is to solve a problem that a viewer having forgotten to turn the power ON misses the TV program in some cases.

As described above, the first to third technologies are to remotely control a fixed device having capabilities of receiving and recording the TV broadcast, which does not relate to a mobile terminal such as the portable cellular phone.

Generally, in the portable cellular phone being the mobile terminal which is driven by the battery, a state of its radio waves varies depending on an environment in which the portable cellular phone is located. On the other hand, a fixed device is driven by stable supply power and a state of its radio waves is stable except in an exceptional environment in which an interference radio wave occurs or a thundercloud/thunderstorm is gathered in a near place. That is, in the technology of remotely controlling the portable cellular phone, considerations have to be given to such the state of radio waves as described above or to a remaining amount of the battery in which an amount of power being able to be consumed is finite, while, in the technology of remote control such the fixed devices as disclosed in the above first and second technologies, no considerations are given to a state of radio waves and power supply.

In addition, some fixed devices are not originally provided with a capability of being connected to a network and, therefore, in order to realize the above first to third technologies, addition of the capability of being connected to the network to these fixed devices is required.

The fourth technology relates to a power supply timer employed in the portable communication device having a capability of receiving the TV broadcast which can prevent a viewer from missing the TV program. The power can be turned ON or OFF from outside over the network. By this technology, an effect of preventing a viewer from missing the TV program scheduled to be watched can be obtained. However, the technology is based on an assumption that the portable communication device is kept at hand and, if the viewer has no portable communication device at hand, the TV program cannot be recorded by remote control from the outside.

SUMMARY OF THE INVENTION

In view of the above, it is an object of the present invention to provide a portable cellular phone capable of recording a TV broadcast (program) therein by remote control even when the portable cellular phone having a capability of receiving the TV broadcast (program) is not kept at hand, a method for setting the portable cellular phone to record the TV broadcast (program), and a TV broadcast record setting system for the portable cellular phone. It is another object of the present invention to provide technology capable of remotely controlling a capability of recording the TV broadcast in a reliable manner even in a state where a level state of receiving radio waves for wireless communications and a state of TV radio waves vary depending on an environment in which the portable cellular phone being a mobile terminal is put and the portable cellular phone is generally driven by a battery and, therefore, an amount of power that can be consumed is finite, which induces a limitation caused by a characteristic peculiar to the mobile terminal imposed on the use of the portable cellular phone.

According to a first aspect of the present invention, there is provided a portable cellular phone including:

a wireless communication unit;

a TV (Television) broadcast receiving unit to receive a TV broadcast;

a TV broadcast record setting unit to make record settings of the TV broadcast according to a record setting signal; and a TV broadcast recording unit to record the TV broadcast in accordance with the record settings of the TV broadcast.

In the foregoing first aspect, a preferable mode is one wherein the record setting signal is received via the wireless communication unit.

Also, a preferable mode is one that wherein further includes a record settings storing unit to store the record settings of the TV broadcast.

Also, a preferable mode is one wherein information about a remaining amount of a battery or about recorded memory is transmitted via the wireless communication unit.

Also, a preferable mode is one wherein, when a level state of receiving a TV radio wave is below a predetermined reference level, information based on the level state of receiving the TV radio wave is transmitted via the wireless communication unit.

Also, a preferable mode is one that further includes, when the level state of receiving the TV radio wave is below a predetermined reference level, another TV broadcast receiving unit to receive the TV broadcast via the wireless communication unit, instead of or together with the TV broadcast receiving unit.

Also, a preferable mode is one that wherein further includes a wireless communication antenna for the wireless communication unit and a TV radio wave antenna for the TV broadcast receiving unit provided respectively in a separated manner.

Also, a preferable mode is one that wherein further includes a shared antenna used in common for the wireless communication unit and for the TV broadcast receiving unit.

Also, a preferable mode is one that wherein further includes a plurality of antennas used for the wireless communication unit and for the TV broadcast receiving unit, whereby the TV broadcast is received in a diversity receiving way.

Also, a preferable mode is one that wherein further includes a record stopping unit to stop or discontinue recording of the TV broadcast when an incoming call is received while the TV broadcast is being recorded.

Also, a preferable mode is one that wherein further includes a function activating unit to activate an unattended answering function when an incoming call is received while the TV broadcast is being recorded.

Also, a preferable mode is one wherein the TV broadcast recording unit is configured such that the TV broadcast signal is code-converted and then recorded.

Also, a preferable mode is one wherein the record setting signal contains a signal for record starting time and a signal for record ending time.

Also, a preferable mode is one wherein the record setting signal contains a TV broadcast recording instruction signal to instruct the TV broadcast recording unit to record the TV broadcast.

Also, a preferable mode is one wherein the TV broadcast record setting unit analyzes the record setting signal and makes the record settings of the TV broadcast, according to program schedule information received via the wireless communication unit or the TV broadcast receiving unit.

Also, a preferable mode is one wherein the record setting signal contains program related information.

Also, a preferable mode is one wherein the record setting signal contains information that designates a region to be erased in recorded memory of the TV broadcast.

Also, a preferable mode is one wherein the record setting signal is made up of a push-sound signal generated and transmitted by pressing down at least one specified dial key.

Also, a preferable mode is one wherein the record setting signal is in an E-mail format.

Also, a preferable mode is one wherein the record setting signal contains a password.

Also, a preferable mode is one wherein, the information based on a level state of receiving the TV radio wave, information about a remaining amount of a battery, or information about record memory, after the record setting signal has been received, is transmitted via the wireless communication unit.

According to a second aspect of the present invention, there is provided a TV broadcast record setting method for a portable cellular phone having capability of receiving TV (Television) broadcast, the method including:

a step of receiving a record setting signal via a wireless communication unit, a step of analyzing the received record setting signal to make a record settings of the TV broadcast, a step of storing the made record settings of the TV broadcast; and a step of recording the TV broadcast in a memory according to the stored record settings of the TV broadcast.

In the foregoing, a preferable mode is wherein the information about a level state of receiving a TV radio wave, information about a remaining amount of a battery, or information about the recorded memory is transmitted via the wireless communication unit.

According to a third aspect of the present invention, there is provided a TV broadcast record setting system for a portable cellular phone including: a terminal, a server, a wireless base station, a TV (Television) broadcast station, a portable cellular phone; and a network, wherein the terminal provides the server over the network with a first information to designate the portable cellular phone, a second information required to use the portable cellular phone, and a third information about TV program;

wherein the server produces a record setting signal based on the first information, the second information, and the third information, and transmits the produced record setting signal over the network and via the wireless base station to the portable cellular phone; and wherein the portable cellular phone makes record settings of the TV broadcast according to the received record setting signal.

With the above configurations, even when the user keeps no portable cellular phone having a capability of receiving the TV broadcast at hand, the user is able to set the portable cellular phone to record the TV broadcast by remote control via a wireless communication circuit.

With another configuration as above, by notifying the user who remotely controls the portable cellular phone of a level state of receiving TV radio waves, an event can be avoided that the TV broadcast could not be recorded exactly as preset by the user.

With still another configuration as above, when a state of TV signal transmission by radio waves is weak, by notifying the user who remotely controls the portable cellular phone of information about a streaming broadcast, the user can come to know a possibility of successfully recording a desired TV program.

With still another configuration as above, by notifying the user who remotely controls the portable cellular phone of a remaining amount of a battery in the portable cellular phone and maximum operating time calculated from the remaining amount of the battery, an event can be avoided that the TV broadcast could not be recorded exactly as preset by the user.

With still another configuration as above, when there is not enough memory in the portable cellular phone, by alerting the user who remotely controls the portable cellular phone, an event can be avoided that the TV broadcast could not be recorded exactly as preset by the user.

With still another configuration as above, by employing a general purpose telephone, PC (Personal Computer), or a like, the portable cellular phone can be set by the user to record the TV broadcast by remote control without using a new device designed for remote control.

With still another configuration, by setting the portable cellular phone to record the TV broadcast by remote control by using a WEB browser, the user can identify a program to be recorded while seeing a program table and, therefore, the user can set the portable cellular phone to record the TV broadcast even when not memorizing a name of a program and/or a broadcasting time period (slot) clearly and vividly.

With still another configuration, an instruction to record the TV broadcast immediately and an instruction to record the TV broadcast when a predetermined time comes are provided and, therefore, detailed requests from the user being in a remote site can be fully responded to.

BRIEF DESCRIPTION OF THE DRAWINGS

The above and other objects, advantages, and features of the present invention will be more apparent from the following description taken in conjunction with the accompanying drawings in which.

DETAILED DESCRIPTION OF THE PREFERRED EMBODIMENTS

Best modes of carrying out the present invention will be described in further detail using various embodiments with reference to the accompanying drawings.

First Embodiment

Figure 1:
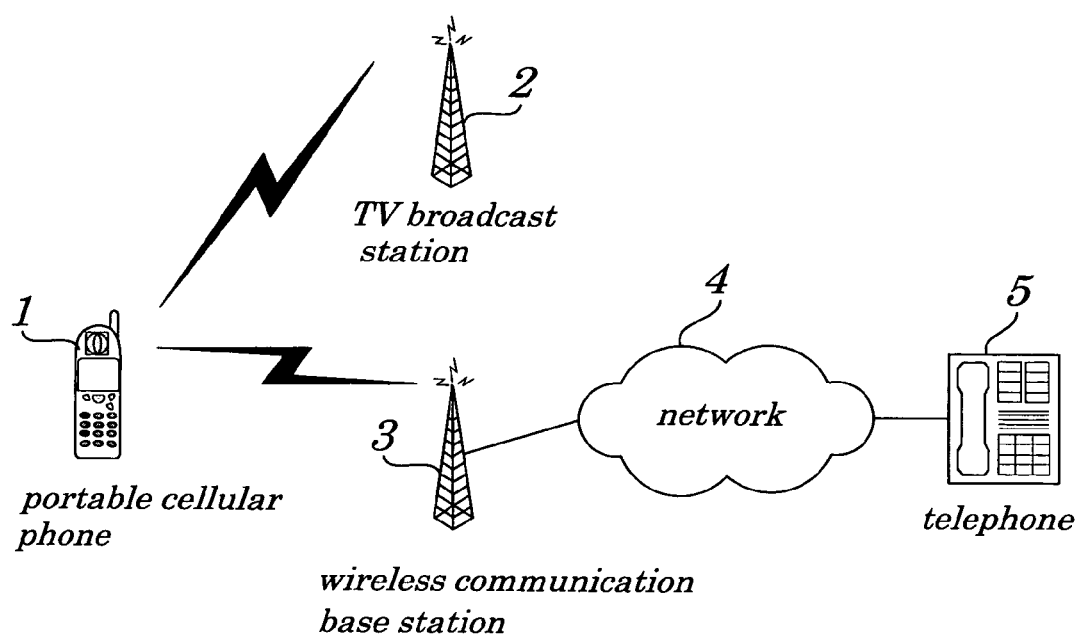
FIG. 1 is a diagram illustrating an entire system in which a portable cellular phone having a capability of receiving a TV broadcast is operated by remote control according to a first embodiment of the present invention.

FIG. 1 is a diagram illustrating an entire system in which a portable cellular phone 1 having a capability of receiving a TV broadcast is operated by remote control according to a first embodiment of the present invention.

The portable cellular phone 1 is connected to a TV broadcast station 2 and a wireless communication base station 3 via wireless communication. The wireless communication base station 3 is connected to a telephone 5 over a network 4. In this system, the telephone 5 can originate a call to the portable cellular phone 1 over the network 4.

The portable cellular phone 1 is one having a capability of receiving the TV broadcast of the present invention and can be set to record the TV broadcast according to a record setting signal received from outside. This will be described later in detail.

The TV broadcast station 2 is a wireless base station to transmit a digital or analog TV broadcast radio wave. The wireless communication base station 3 is a wireless base station to receive and transmit a wireless signal to be used to carry out voice or data communication with the portable cellular phone 1.

The network 4 is a public circuit network for a telephone. When a telephone network is constructed by VoIP (Voice over IP) technology, the network 4 serves as an IP (Internet Protocol) network. Moreover, over this network 4, data communication, besides voice communication, can be carried out.

Figure 2:
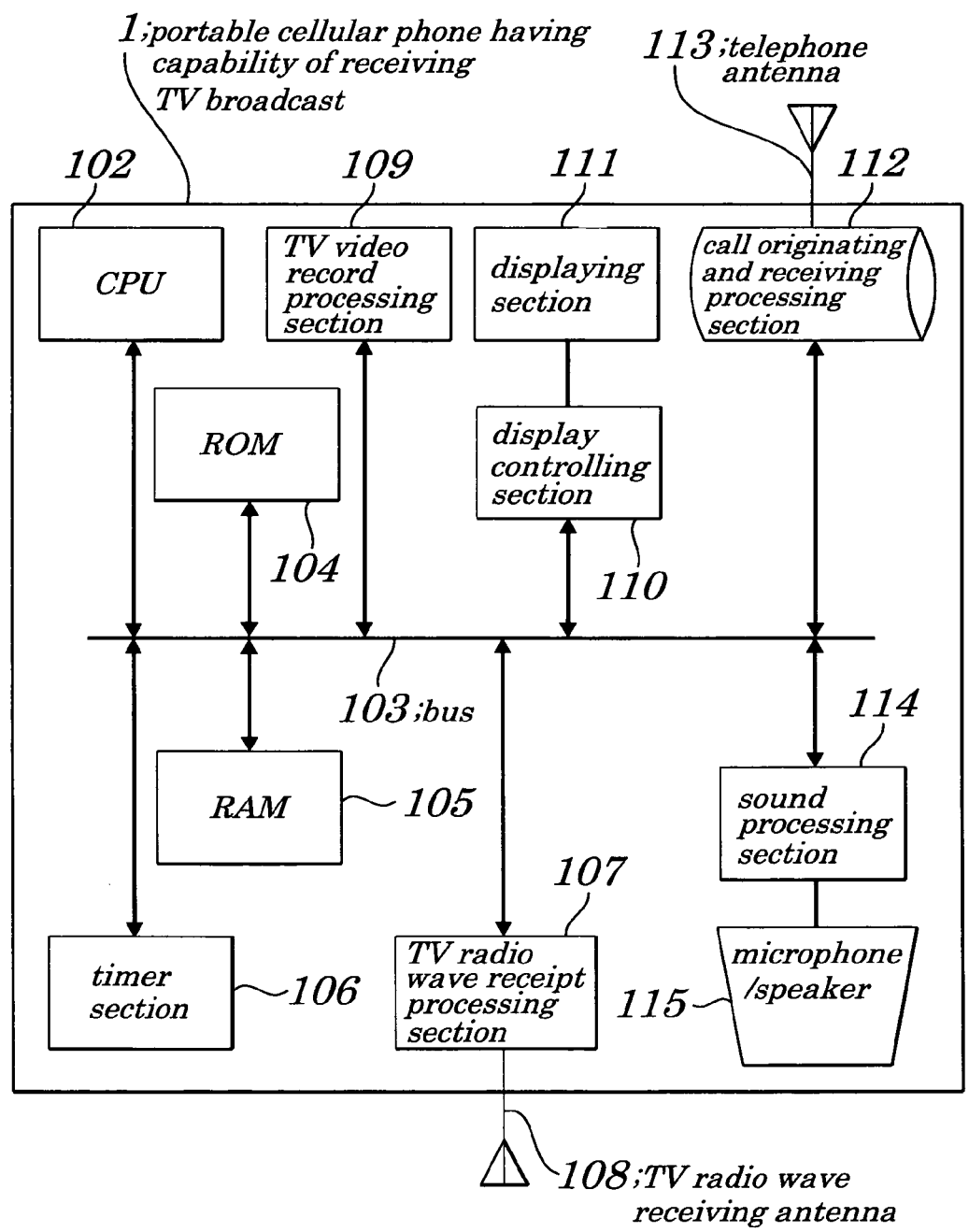
FIG. 2 is a block diagram showing configurations of a circuit making up the portable cellular phone having the capability of receiving the TV broadcast according to the first embodiment of the present invention.

FIG. 2 is a diagram showing configurations of main circuits making up the portable cellular phone 1 having the capability of receiving the TV broadcast according to the first embodiment of the present invention.

The portable cellular phone 1 has a CPU (Central Processing Unit) 102 and the CPU 102 is connected to each component in the portable cellular phone 1 via a bus 103.

A ROM (Read Only Memory) 104 is a memory to store various control programs to operate the CPU 102, video data of the recorded TV broadcast, unattended recording answer voice data recorded when a voice call was received, or a like.

A RAM (Random Access Memory) 105 is a memory to store data being temporarily required when the CPU 102 operates programs. The RAM 105 is used, for example, when application software such as a browser or a like is ordinarily executed or when format conversion required to store video data of the received TV broadcast and voice data into the ROM 104 is made.

A timer section 106 is a time counting portion in which automatic response processing at time of receiving a call, timer processing at time of recording the TV broadcast, or a like are performed.

A TV radio wave receipt processing section 107 is a codec circuit to produce TV broadcast data by performing codec processing on data resulting from conversion, processing, and analysis of the TV signal carried by radio waves and received via a TV radio wave receiving antenna 108.

A TV video record processing section 109 is a circuit to convert video and voice data on which the TV radio wave receipt processing section 107 has performed codec processing into a format suitable for storing the data into the ROM 104, by using the RAM 105.

A display controlling section 110 is a controlling circuit to control displaying performed by a displaying section 111. The displaying section 111 is placed on a front or rear of a main body (not shown) of the portable cellular phone and is a display device using a monochrome or color liquid crystal panel or an organic EL (electroluminescent) device, or a like. The displaying section 111 displays contents of answering processing at a time of receiving an incoming call or the TV broadcast video data.

A call originating and receiving processing section 112 is a circuit to transmit or receive voice data or non-voice data such as E-mail or a like via wireless communication using a telephone antenna 113.

A sound processing section 114 is a circuit to control ringing tone or a like of a microphone/speaker 115.

Next, operations of the portable cellular phone 1 shown in FIG. 2 are described below.

When the portable cellular phone 1 receives an incoming-call signal through the telephone antenna 113 from the wireless communication base station 3, the received incoming call, after being frequency-converted and demodulated by the call originating and receiving processing section 112, is supplied to the CPU 102 via the bus 103. The CPU 102 instructs the call originating and receiving processing section 112 to answer the incoming call, the sound processing section 114 to output an incoming call sound from the microphone/speaker 115 and the display controlling section 110 to display an incoming-call image on the displaying section 111.

When the portable cellular phone 1 is put in an off-hook condition during the operation of receiving an incoming-call, a speech is made possible. When the portable cellular phone 1 is preset to perform automatic answering unattended record processing, even if the portable cellular phone 1 is put in an off-hook condition, after a predetermined time elapses, automatic answering is performed to start recording processing.

When the portable cellular phone 1 is put in a speech state, voice made by a user of the portable cellular phone 1 is input via the microphone/speaker 115 and is then converted into a voice signal by the sound processing section 114 and, after processing of modulation and frequency conversion is performed on the voice signal by the call originating and receiving processing section 112, is finally output via the telephone antenna 113.

On the other hand, voice made by an other user on the other end of the communications line (radio channel) is received by the telephone antenna 113 and is then frequency-converted and demodulated by the call originating and receiving processing section 112 and is further converted by the sound processing section 114 into a voice signal and is finally output as voice from the microphone/speaker 115.

Also, the CPU 102 instructs the display controlling section 110 to make the displaying section 111 display a message indicating that speech is possible.

When the user performs a call-signal transmission operation using an operating section (not shown), a call-signal (including information about an input telephone number and about a telephone number stored, in advance, in the ROM 105) is transmitted by the CPU 102 through the call originating and receiving processing section 112 and telephone antenna 113 to the wireless communication base station 3. In addition, the CPU 102 instructs the display controlling section 110 to have the displaying section 111 display a message indicating that a call signal is being transmitted and to have the sound processing section 114 produce a beep indicating that the call signal is under transmission from the microphone/speaker 115.

When the portable cellular phone 1 is put by another user on the other end of the communications line into an off-hook condition during the operation of call-signal transmission, a speech is made possible. Speech operations are the same as those performed after an incoming call has been received and descriptions are omitted to avoid redundancy accordingly.

The user can watch the TV broadcast over the portable cellular phone 1. However, if the user is not receiving the TV broadcast to reduce power consumption, no power is supplied to the TV radio wave receipt processing section 107 and the TV video record processing section 109. Also, no program to operate by using the CPU 102 runs for performing the capability of receiving the TV broadcast.

Therefore, when the TV broadcast is to be received by the user, it is necessary for the user to instruct, by using an operating section (not shown), the CPU 102 to execute the program for performing the capability of receiving the TV broadcast. After that, power is supplied to the TV radio wave receipt processing section 107.

The TV signal carried by radio waves and received through the TV radio wave receiving antenna 108 is decoded by the TV radio wave receipt processing section 107. The decoded TV broadcast data is transmitted to the display controlling section 110 and the sound processing section 114. A video signal is displayed on the displaying section 111 and a voice signal is reproduced by the microphone/speaker 115.

When the TV broadcast is to be recorded, as in the case of performing the TV broadcast receiving capability, the user instructs, by using the operating section (not shown), the CPU 102 to run a program for recording the TV broadcast. After that, power is supplied to the TV video record processing section 109.

Figure 3:
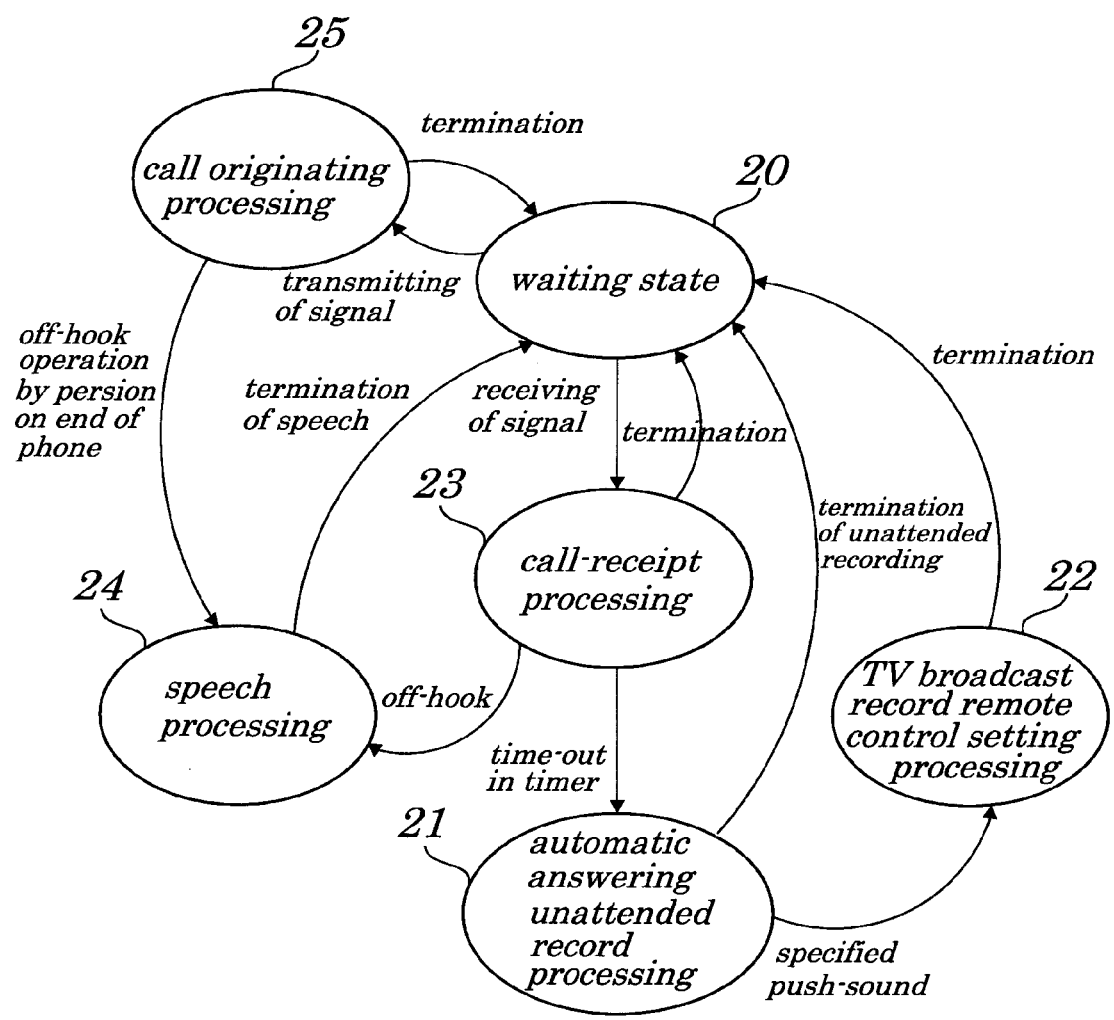
FIG. 3 is a state transition diagram illustrating a state of each processing to be performed by the portable cellular phone according to the first embodiment of the present invention.
Figure 4:
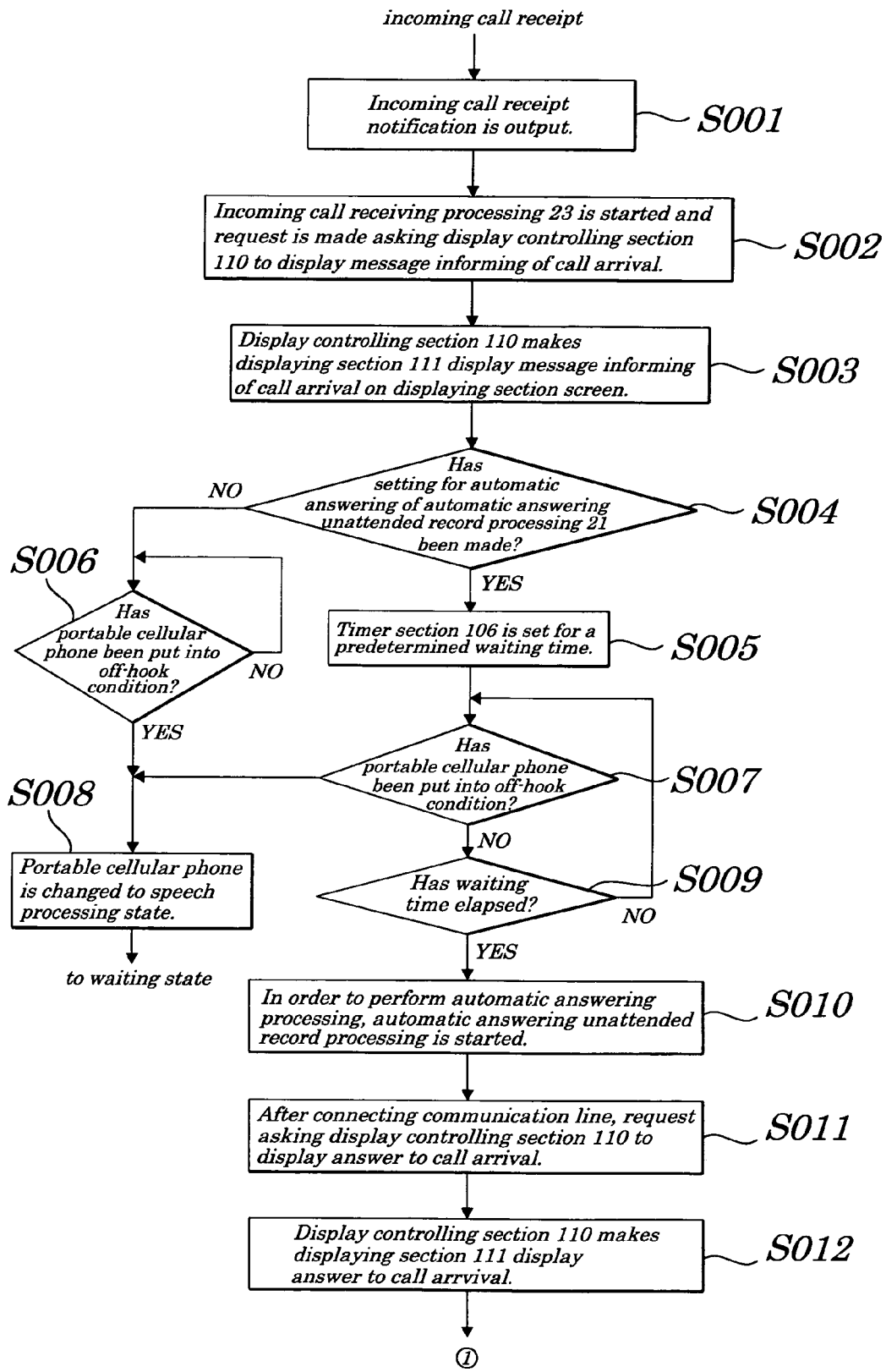
FIG. 4 is a flow chart showing procedures for setting the portable cellular phone to record the TV broadcast according to the first embodiment of the present invention.

Signal format conversion is made, by the TV video record processing section 109, on TV broadcast data being output from the TV radio wave receipt processing section 107 and the converted data is accumulated in the ROM 104. FIG. 3 shows main state transitions of the portable cellular phone 1 having the capability of receiving the TV broadcast occurring when the portable cellular phone 1 is set to record the TV broadcast by remote control.

As shown in FIG. 3, the portable cellular phone 1, when its power is on, is put into a waiting state 20. In this waiting state 20, the user can originate a call and can receive an incoming call from another user.

When the user of the portable cellular phone 1 originates the call in the waiting state 20 to the other user, an operating state of the portable cellular phone 1 is changed from its waiting state 20 to a state of call originating processing 25. At this time point, the portable cellular phone 1 is in a state where a program is running which operates, by a call originating operation, the call originating and receiving processing section 112 to originate the call to the other user via the telephone antenna 113 and to make the displaying section 111 display a message indicating that the call has been originated.

When the other user on the other end of the communications line puts the portable cellular phone into the off-hook condition, an operating state of the portable cellular phone 1 is changed to a state of speech processing 24. On the other hand, in the state of the call originating processing 25, when the user of the portable cellular phone 1 puts the portable cellular phone 1 into an on-hook condition, the call originating processing 25 is terminated, and the operating state of the portable cellular phone 1 is changed to its waiting state 20.

When the portable cellular phone 1 receives an incoming call from the other user in the waiting state 20, the operating state of the portable cellular phone 1 is changed to a state of call-receipt processing 23. This is a state in which a program is running for performing processing of making the displaying section 111 display a message that an incoming call has been received and of outputting an incoming call sound from the microphone/speaker 115.

When the portable cellular phone 1 is put into the off-hook condition in the state of the call-receipt processing 23, the operating state of the portable cellular phone 1 is changed to the state of its speech processing 24. This is a state in which ordinary speech processing by voice between a calling party and a called party is performed. When a speech terminates, the operating state of the portable cellular phone 1 is changed to the waiting state 20.

When, in the state of the call-receipt processing 23, the portable cellular phone 1 is not put into the off-hook condition for a predetermined period of time, the operating state of the portable cellular phone 1 is changed to a state of an automatic answering unattended record processing 21. This is a state corresponding to a so-called function of a phone-answering machine, which automatically answers a phone and records a voice of the incoming call. This function enables the user of the portable cellular phone 1 to hear a recorded message of the calling party at a later time. However, it is necessary to make, in advance, setting to perform the automatic answering unattended record processing 21.

In a case where no setting is made to perform the automatic answering unattended record processing 21 in the state of the call-receipt processing 23, the portable cellular phone 1 still remains in the state of the call-receipt processing 23 unless there is the off-hook operation or a shutdown of a communications line (circuit).

In the state of the automatic answering unattended record processing 21, if a calling party (user) produces a specified push-sound signal by a key operation of a calling party's phone, the operating state of the portable cellular phone 1 is changed to the state of its TV broadcast record remote control setting processing 22. In the state of the TV broadcast record remote control setting processing 22, the calling party can perform processing of setting to record the TV broadcast. After setting, if the shutdown occurs in the communications line, the operating state of the portable cellular phone 1 is changed to the waiting state 20.

Each processing described above can be generally achieved by using programs to be executed by the CPU 102, ROM 104, and RAM 105 in the portable cellular phone 1.

FIGS. 4 to 7 are flowcharts to mainly explain operations of the portable cellular phone 1 when being set to record the TV broadcast by remote control from a remote site. In the flowcharts, however, operations of the user who remotely operates the portable cellular phone 1 are described for easy understanding.

For example, the user who has forgotten to bring the portable cellular phone 1 and does not keep the portable cellular phone 1 at hand, when the user wants to set the portable cellular phone 1 to record the TV broadcast by remote operation, originates a call to the portable cellular phone 1 by using the telephone 5. An originating call signal is transmitted to the portable cellular phone 1 over the network 4 and via the wireless communication base station 3.

When the portable cellular phone 1 receives an incoming call from the other user of the portable cellular phone 1, the call originating and receiving processing section 112 in the portable cellular phone 1 outputs incoming call receipt notification to the bus 103 (Step S001).

The CPU 102, when having received incoming call receipt notification, runs a program for performing the call-receipt processing 23. By the program for performing the call-receipt processing 23, a communications line is connected and the notification to start the call-receipt processing 23 is carried out and a message of an arrival of the call is displayed on a screen (not shown) of the displaying section 111 (Steps S002 and S003).

The CPU 102 checks whether or not setting for automatic answering of the automatic answering unattended record processing 21 has been made (Step S004).

In a case where setting for automatic unattended answering has not been made, whether the portable cellular phone 1 has been put into the off-set condition without setting the timer section 106 for recording time to start is monitored (Step S006) and, if the portable cellular phone 1 has been put into the off-set condition, the operating state of the portable cellular phone 1 is changed to the state of its speech processing 24 (Step S008). When the speech is terminated, the operating state of the portable cellular phone 1 is changed to the waiting state 20.

On the other hand, in a case where setting for the automatic answering has been made, the timer section 106 is set for a predetermined waiting time and measurement of the waiting time is started (Step S005).

Whether or not the portable cellular phone 1 has been put into the off-hook condition is monitored for a period before the waiting time elapses (Step S007) and, if the portable cellular phone 1 is put into the off-hook condition, the operating state of the portable cellular phone 1 is changed to the state of the speech processing (Step S008).

In a case where the portable cellular phone 1 is not put in the off-set condition, the timer section 106, when the measured time exceeds the set waiting time, a notification of occurrence of time-out is output (Step S009, YES).

The CPU 102, when receiving a notification of occurrence of the time-out, in order to perform automatic answering processing, runs a program for automatic answering unattended record processing 21 (Step S010).

Figure 5:
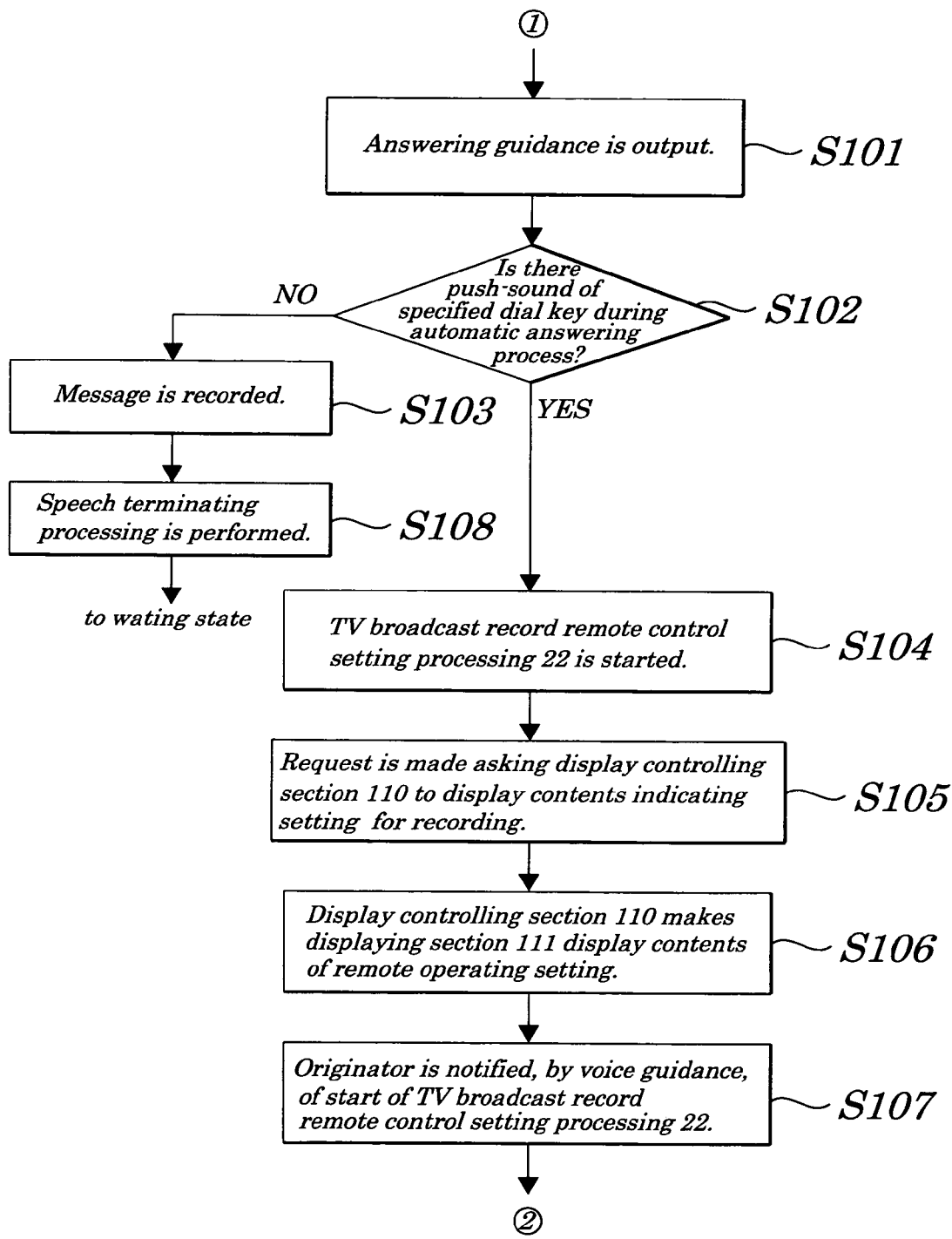
FIG. 5 is also a flowchart showing procedures for setting the portable cellular phone to record the TV broadcast according to the first embodiment of the present invention.

In the automatic answering unattended record processing 21 being started as above, the displaying section 111 displays an answer to the incoming call (Steps S011 and S012) and outputs an answering guidance via the communications line being connected to the call originator (Step S101 shown in FIG. 5).

In a case where a predetermined dial key to make setting the portable cellular phone 1 to record the TV broadcast is not pressed down by the call originator during the process of automatic answering (Step S102, NO), as in the case of the ordinary phone answering machine, voice of the other user is recorded (Step S103). If the shutdown occurs in the communications line by the on-hook operation on the call originating terminal, speech terminating processing is performed (Step S108) and the state of the portable cellular phone 1 is changed to the waiting state 20.

On the other hand, in Step S102, when the predetermined dial key to start the TV broadcast record remote control setting processing 22 is pressed down, the program for the TV broadcast record remote control setting processing 22 is started (Step S104).

By the TV broadcast record remote control setting processing 22 started as above, a frame for setting a remote control is displayed on the displaying section 111 (Steps S105 and S106) and the call originator is notified, by voice guidance, of startup of the TV broadcast record remote control setting processing 22 via the communications line being connected (Step S107).

The call originator, after having confirmed that the program for the TV broadcast record remote control setting processing 22 is started, presses down the predetermined dial key to set the portable cellular phone 1 to record the TV broadcast immediately or at a specified time. A push-sound of the dial key(s) pressed down by the call originator is transmitted, through a communications line, to the portable cellular phone 1 having the capability of receiving the TV broadcast.

Figure 6:
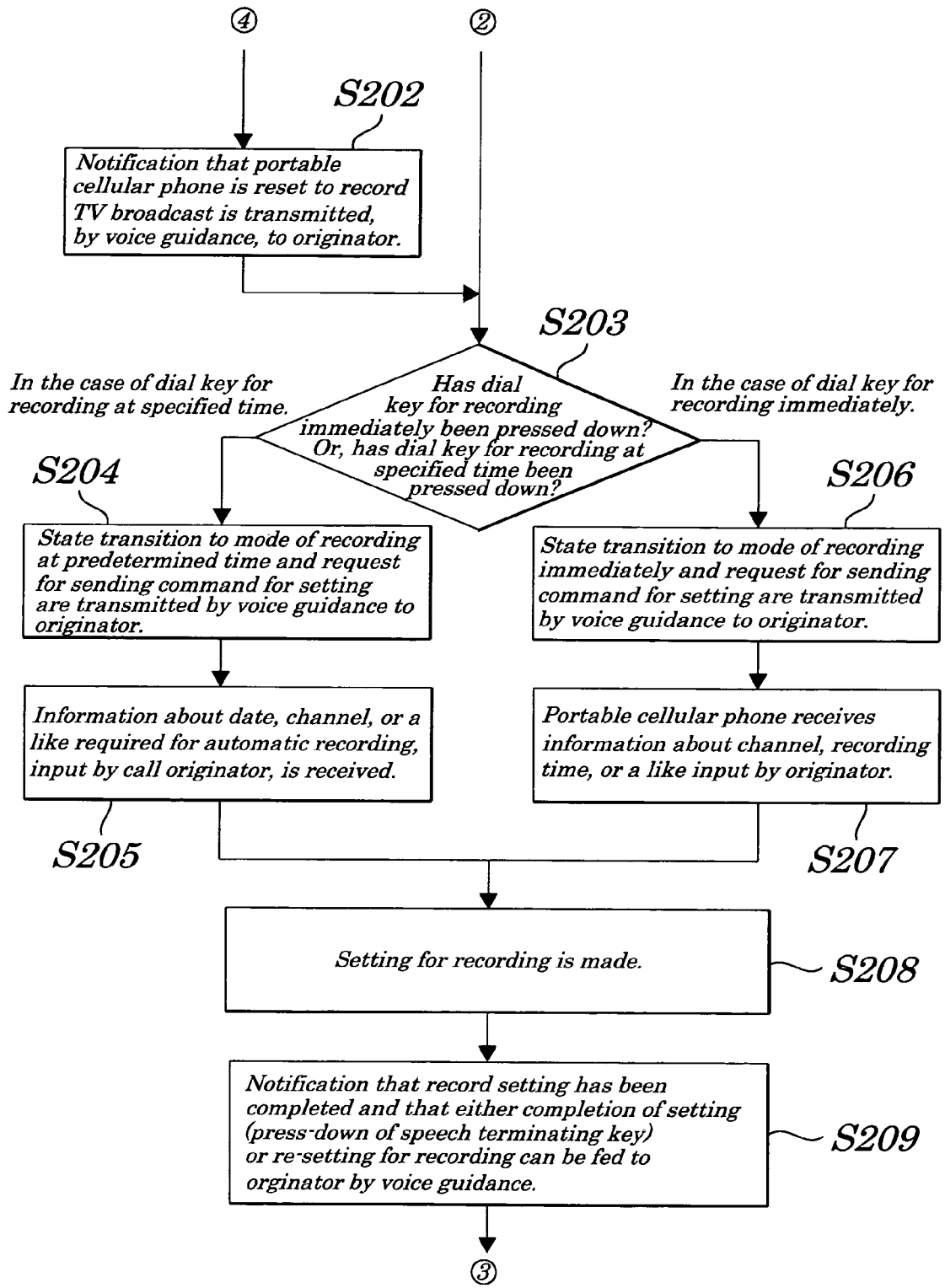
FIG. 6 is also a flowchart showing procedures for setting the portable cellular phone to record the TV broadcast according to the first embodiment of the present invention.

In the TV broadcast record remote control setting processing 22, whether the key used to set the portable cellular phone 1 to record the TV broadcast at the specified time or immediately is pressed down by the call originator being at the remote site is judged (see FIG. 6, Step S203).

When it is judged that the key used to set the portable cellular phone 1 to record the TV broadcast at the specified time is pressed down, the TV broadcast record remote control setting processing 22 is put into a mode of recording the TV broadcast at the specified time and a voice guidance notifying that the TV broadcast record remote control setting processing 22 has been put into to the mode of recording the TV broadcast at the specified time and that transmission of a command for continuous setting is required is sent to the originator (Step S204).

According to the notification described above, the originator inputs information about a recording time period including a date, a channel, starting time, ending time, or a like needed for automatic recording, information about a screen size and a frame rate used to determine recording quality needed when recorded contents are finally to be stored into the ROM 104, or a like. The input information is received by the portable cellular phone 1 (Step S205). The above information are information required for record setting, however, in addition to the date or a like, the information can include a password or a like to prevent an unauthorized person from setting the portable cellular phone 1 to record the TV broadcast. The record setting information required for setting to record the TV broadcast at the specified time includes a TV broadcast record presetting instruction to instruct recording of the TV broadcast on a specified channel to be started when the recording time to start occurs. The record setting information is transmitted as a record setting signal to the portable cellular phone 1 via wireless communication.

When the originator inputs the record setting information according to the voice guidance, it is preferable that inputting operations are performed in an interactive manner as described below.

The portable cellular phone 1 feeds the voice guidance having a message "please input a date of a desired program to be recorded, followed by pressing the "pound" key" to the originator. When the originator desires to notify a date "October 30", the originator inputs "1030#". The portable cellular phone 1, when confirming a push-sound corresponding to "1030#", feeds another voice guidance having a message "Are you sure that it is October 30? If it is all right, push a key 1. If you wish to start all over again, push a key 0". When the originator having heard the voice guidance pushes the key 1, the date is finally determined, and if the originator pushes the key 0, the inputting operation of the date is again tried. After the date has been determined, the portable cellular phone 1 feeds a voice guidance having a message "please input a channel of a desired program to be recorded, followed by pressing the "pound" key" to the originator. Thus, by a procedure similar to that for inputting a date, the portable cellular phone 1 is notified of the channel number information in an interactive manner. Similarly, each item of information required for setting to record is notified interactively to the portable cellular phone 1.

When it is judged in Step S203 that the key used to set the portable cellular phone 1 to record the TV broadcast immediately is pressed down, the TV broadcast record remote control setting processing 22 is put into a mode of immediate recording and a voice guidance notifying that the TV broadcast record remote control setting processing 22 has been put into the mode of recording the TV broadcast immediately (mode of immediate-record setting) and that transmission of a command for continuous setting is required is sent to the originator (Step S206).

According to the notification, the originator inputs information about the channel, the recording time, and the screen size and the frame rate used to determine recording quality needed when recorded contents are finally to be stored into the ROM 104, or the like. The input information is received by the portable cellular phone 1 having the capability of receiving the TV broadcast over the public circuit network (network 4) (Step S207). The above information are information required to set to record a TV broadcast, however, in addition to the channel or a like described here, the information can include the password or the like to prevent the unauthorized person from setting the portable cellular phone 1 to record the TV broadcast. The record setting information required for setting to record the TV broadcast immediately includes the TV broadcast record presetting instruction to instruct recording of the TV broadcast to be started without delay after receipt of the record presetting instruction. The record setting information is transmitted as the record setting signal to the portable cellular phone 1 via wireless communication.

In the case of setting to immediately record the TV broadcast, as in the case of setting to record at the specified time, the setting operations can be performed between the originator and the portable cellular phone 1 in the interactive manner by using the voice guidance.

In addition, when the originator desires to record the TV broadcast immediately, it is assumed, in some cases, that the originator does not want to spend time on setting an item such as recording quality. In this case, the portable cellular phone 1 can be configured so that its recording function is operated immediately only by inputting minimum information about a channel number required for recording.

In the TV broadcast record remote control setting processing 22, when the portable cellular phone 1 is notified by the originator of each item for record setting, setting to record the TV broadcast is made as notified by the originator (Step S208) and a voice guidance notifying completion of the setting and an inquiry guidance as to whether the setting is terminated (press-down of speech terminating key) or resetting is made are fed to the originator (Step S209).

Figure 7:
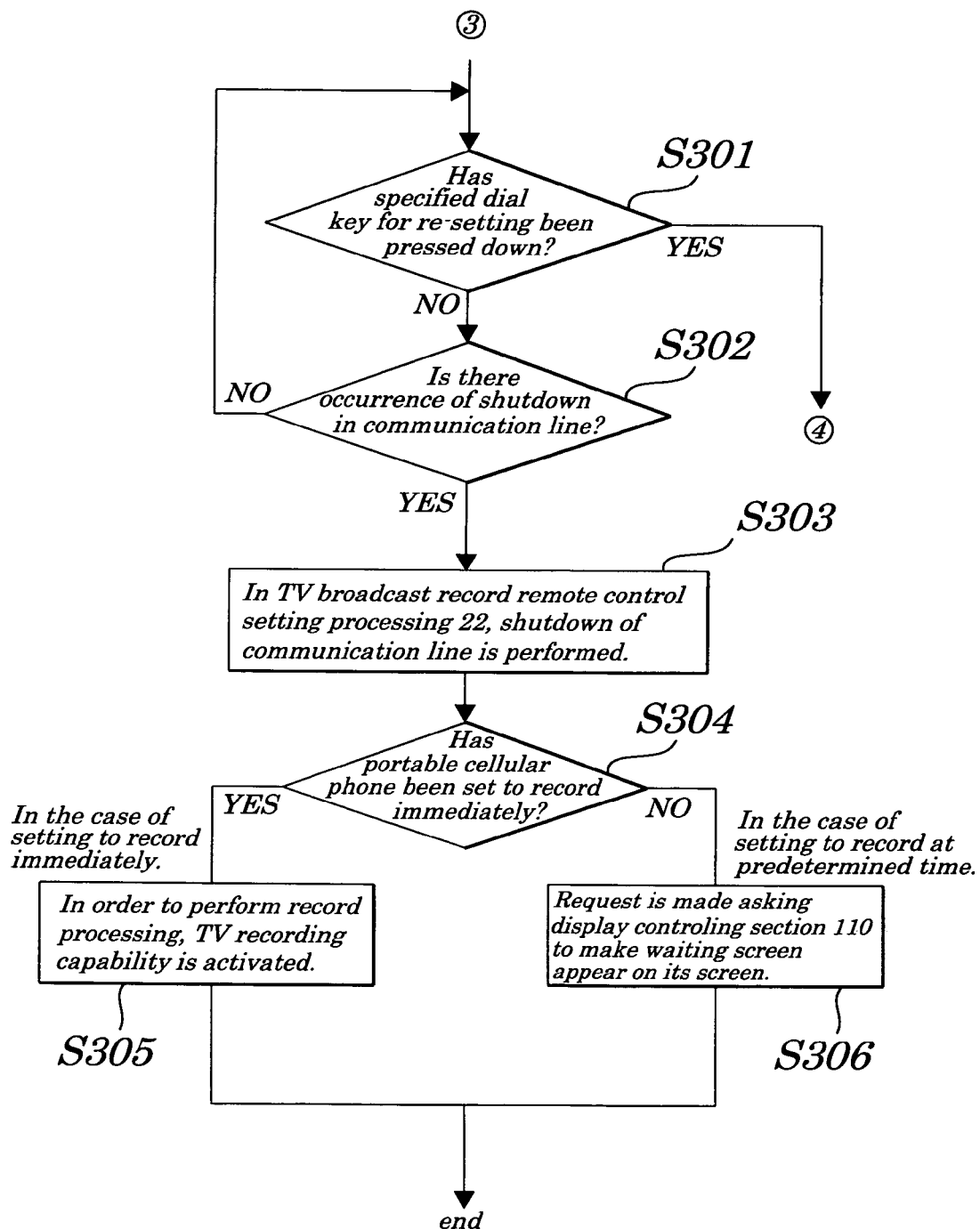
FIG. 7 is also a flowchart showing procedures for setting the portable cellular phone to record the TV broadcast according to the first embodiment of the present invention.

Next, judgement is made as to which dial key is pressed down by the originator having received the above inquiry guidance (see FIG. 7, Steps S301 and S302).

In a case where it is judged that the specified dial key for re-setting has been pressed down (Step S301, YES), the portable cellular phone 1 is again put into the state waiting for the setting command in each mode and the notification that the portable cellular phone 1 is in the state of setting to record the TV broadcast is fed to the originator through the voice guidance (FIG. 6, Step S202).

On the other hand, in a case where it is judged by the originator that the speech terminating key has been pressed down and, as a result, the shutdown in a communications line has occurred (Step S302, YES), the call originating and receiving processing section 112 notifies the bus 103 of the occurrence of the shutdown in the communications line and the CPU 102 performs shutdown processing of the communications line (Step S303) and processing of terminating the record setting mode.

Now, operations for setting the portable cellular phone 1 to record the TV broadcast are complete.

Then, the CPU 102 judges whether the portable cellular phone 1 is set to record the TV broadcast immediately or at the specified time (Step S304).

In the case of mode of setting the portable cellular phone 1 to immediately record the TV broadcast, in order to perform record processing and start recording, the TV recording capability is activated (Step S305).

In the case of the mode of setting the portable cellular phone 1 to record the TV broadcast at the specified time, a request is made asking the display controlling section 110 to make a waiting screen appear on a screen of the displaying section 111 (Step S306). Then, when the predetermined time comes, recording of the TV broadcast using the TV recording capability is started.

In the embodiment, the TV broadcast record remote control setting processing 22 to be performed by the portable cellular phone 1 is started by a push-sound signal generated when at least one specified dial key is pressed. However, the TV broadcast record remote control setting processing 22 may be started by push-sound signals obtained by pressing a plurality of dial keys in combination.

In this case, a variety of passwords can be configured depending on each combination of the dial keys. The portable cellular phone 1 can be configured so that no state transition to the TV broadcast record remote control setting processing 22 occurs unless password matching is found, which prevents the unauthorized person other than the user of the portable cellular phone 1 from setting the portable cellular phone 1 to record the TV broadcast.

The circuit configuration of the portable cellular phone 1 described above in the embodiment is one of examples and other configurations may be employed. Part or all of each component can be integrated into one circuit block and can be realized by software.

For example, the timer section 106 may be configured as a non-independent circuit, that is, may be achieved by a clock in the CPU 102 and an internal counter. The TV video record processing section 109 may be realized by software and may be operated by the CPU 102. The TV radio wave receipt processing section 107 and the TV video record processing section 109 may be constructed integrally. Memory to store programs may be mounted in the CPU 102.

In the embodiment, the telephone antenna 113 for wireless communication and the TV radio wave receiving antenna 108 are separately mounted in the portable cellular phone 1, however, these two antennas may be integrally configured as one antenna and their capabilities may be performed in common. Moreover, the portable cellular phone 1 may be equipped with two or more antennas and may use the two or more antennas in a manner to be used in common, by a switching receiving method or by a diversity receiving method, in response to changes in level state of receiving each of the TV radio waves and wireless communications radio waves, and/or changes in frequency of receiving radio waves. Otherwise, the two or more antennas may be used to be switched or by a diversity receiving method, in response to changes in level state of receiving each of the TV radio waves and wireless communications radio waves, and/or changes in frequency of receiving radio waves. The use of the antenna by the switching receiving method or by the diversity receiving method can be applied to communications between the telephone antenna 113 and TV radio wave receiving antenna 108, or communications among the antennas of the same type. By employing the diversity receiving method, stable receiving of the TV broadcast and stable wireless communication can be carried out.

If a remaining amount of the battery in the portable cellular phone 1 is small, there is a risk that, due to short operating time in the circuit, recording of the TV broadcast is discontinued midway and image quality is degraded. In order to solve the above problems and for the originator to set the portable cellular phone 1 to record the TV broadcast exactly as is set by the originator, a supply of information about the remaining amount of the battery in the portable cellular phone 1 and about maximum record enabling time based on the remaining amount amount of the battery to the originator is helpful.

Effective timing with which information is to be supplied is, for example, time immediately after the TV broadcast record remote control setting processing 22 is started or time when a request is made by the originator at the time of setting the portable cellular phone 1 to record the TV broadcast. This is because the originator can obtain information about the remaining amount of the battery in advance before setting for recording is started. Information is supplied by using a voice guidance or by a specified alarm sound.

To measure the remaining amount of the battery, a voltmeter (not shown) or a like can be used. Maximum record enabling time based on the remaining amount of the battery can be calculated by using the CPU 102 based on a power value, stored in advance in the ROM 104, RAM 105, or a like, consumed when a recording capability is performed.

Similarly, a supply of information about a level state of receiving TV radio waves in a site where the portable cellular phone 1 is placed to the originator is helpful. For example, in a case where receiving the TV broadcast on a specified channel at a quality level specified by the user of the portable cellular phone 1 is impossible due to a weak level state of receiving the TV radio wave in a state where the portable cellular phone 1 is located or in a case where image quality is degraded, such the condition is transferred, by a voice guidance or a like, to the user of the portable cellular phone 1. Moreover, for example, irrespective of the level state of receiving the TV radio wave, by a specified push-sound transferred from the originator to the portable cellular phone 1, information about the level state of receiving the TV radio wave may be notified to the portable cellular phone 1. In this case, the level state of receiving the TV broadcast for every channel may be prepared for the portable cellular phone 1. Moreover, information about correspondence between a channel and a frequency may be provided the portable cellular phone 1 with. Also, guidance information about a TV program at a site where the portable cellular phone 1 is located may be fed to the portable cellular phone 1.

For example, measurement on received TV radio waves is made as follows. In an ordinary state, since a supply of power to the TV radio wave receipt processing section 107 is stopped to reduce power consumption, the CPU 102 provides an instruction to supply power to the TV radio wave receipt processing section 107. Next, the CPU 102 makes the TV radio wave receipt processing section 107 measure the TV radio waves received by the TV radio wave receiving antenna 108. The measurement is made on TV radio waves transmitted on a channel specified by the CPU 102. Results from the measurement are analyzed by the CPU 102. After the measurement or analysis, according to an instruction of the CPU 102, the supply of power to the TV radio wave receipt processing section 107 is promptly stopped. Moreover, since the aim of stopping the supply of power is to reduce power consumption, reduction of the power can be achieved only by changing an operation mode to a sleep mode.

Timing with which information about a level state of receiving the TV radio wave is provided may be time before the portable cellular phone 1 receives the record setting signal or time after the portable cellular phone 1 has received the record setting signal. Generally, a level state of receiving the TV radio wave varies depending on the channel and it is, therefore, preferable that information about the level state of receiving the TV radio wave is fed after the record setting signal has been received and information about the channel on which the TV broadcast to be recorded was specified has been fed to the portable cellular phone 1. This is because the portable cellular phone 1 measures TV radio waves on a channel specified for recording the TV broadcast and a judgement based on the measurement result can be fed by a voice guidance or a like to the user of the portable cellular phone 1. In ordinary cases, information about the level state of receiving the TV radio waves on a channel other than the channel specified for recording the TV broadcast is not needed by the user of the portable cellular phone 1.

In a case where a voice guidance or a like is fed after the record setting signal has been received, for example, the CPU 102, according to record setting information, makes the TV radio wave receipt processing section 107 monitor the level state of receiving TV radio waves on the channel specified by the record setting information. A voice signal including a voice guidance for judgement information based on the measurement results or a like can be transmitted through the call originating and receiving processing section 112 and the telephone antenna 113 in the same manner as employed to perform the ordinary speech processing.

In a case where the voice guidance or the like is fed before the record setting signal is received, for example, if the specified push sound is transmitted from the user to the portable cellular phone 1, the CPU 102 makes the TV radio wave receipt processing section 107 monitor the level state of receiving TV radio waves on all TV channels. A judgement is made based on all measurement results and the information is notified by a voice guidance or a like to the user of the portable cellular phone 1. The user, by using the above information, can avoid setting the portable cellular phone 1 to record the TV broadcast on the channel in which the weak level state of receiving radio waves is occurring. The user may make the portable cellular phone 1 monitor the level state of receiving TV radio waves only on the channel specified by the user.

Whether the level state of receiving the TV radio wave is good or bad is judged according to pre-set recording quality. By using, for example, power of the TV radio wave, a receiving error rate, or an error correcting rate, or a like of the TV broadcast signal, a degree of degradation is converted into numbers. By comparing the converted numbers with the pre-set recording quality, the above judgement is made possible.

In the embodiment, the TV broadcast is provided by the TV broadcast station 2, however, the present invention is not limited to the embodiment described above. For example, the TV broadcast may be received by using a manner of streaming broadcast via a wireless communications line.

For example, in a case where, though the level state of receiving a TV radio wave from the TV broadcast station 2 is poor, the level state of receiving the TV radio wave via wireless communication is good, instead of using the TV broadcast station 2, streaming broadcast can be effectively received through the wireless communication base station 3.

In addition, the portable cellular phone 1 may be configured so as to feed information about whether or not the TV program specified by the record setting procedure is to be broadcast by using a manner of streaming broadcast and, if the TV program is broadcast by the streaming method, information about its time period (slot), channel number, URL (Uniform Resource Locator) or a like may be fed to the originator. In order to achieve this, the portable cellular phone 1 downloads, in advance, a schedule table of a streaming broadcast in every predetermined time and searches for the schedule table and judges whether or not the TV program for which setting for recording has been made is contained in the schedule table by using the downloaded schedule table.

If there is a wireless communication base station facilities (for example, a local wireless communication base station call a "Hot Spot") which enables high-speed wireless communications in the neighborhood besides the wireless communication base station 3, the portable cellular phone 1 may feed information about this to an originator. In ordinary cases, when compared with wireless communications line, a larger amount of data can be treated and images of higher quality can be received more effectively in high-speed wireless communication such as the "Hot Spot".

When the originator sets the portable cellular phone 1 to record the TV broadcast, if the originator does not memorize exactly a channel number or broadcast start time, the portable cellular phone 1 may be provided with a function of searching for a program according to keywords, which is useful.

For example, when the originator sets the portable cellular phone 1 to record the TV broadcast, the originator feeds keywords such as a program name, program genre, performer, or a like to the portable cellular phone 1 by a voice signal or by a push-sound signal and the portable cellular phone 1 searches for program information according to the keywords.

In order to search for program information, the portable cellular phone 1 preferably has, in advance, TV broadcast program information. TV broadcast program information of a TV broadcast may be a TV program table. The TV program table transmitted from the TV broadcast station 2, after being received through the TV radio wave receiving antenna 108 and processed by the TV radio wave receipt processing section 107, may be stored in the ROM 104. Also, the TV program table may be downloaded from a specified server on the Internet (not shown) through the wireless communication base station 3 and over the network 4. The TV program table received via the telephone antenna 113 and processed by the call originating and receiving processing section 112 is stored in the ROM 104. Furthermore, every time the keyword searching is tried, the TV program table, instead of being stored in the portable cellular phone 1, can be searched for in a specified server by accessing the specified server on the Internet (not shown) through the wireless communication base station 3 and over the network 4.

The TV program table is preferably drawn up based on present time and it is necessary that the TV program table is the up-to-date at the time of setting to record the TV broadcast. The portable cellular phone 1 may download the TV program table periodically or may download the TV program table when an instruction to search for program information based on the keyword is received.

The portable cellular phone 1 specifies the keyword transmitted from the originator by voice analysis and push-sound analysis. Next, the portable cellular phone 1 makes the CPU 102 operate a search program, in advance, accumulated in the memory (ROM 104) to download the TV program and specifies broadcast starting time, broadcast ending time, channel, or a like and feeds a result from the keyword search to the originator. The originator, even after setting to record the TV broadcast based on the fed TV program information has been completed, may again search for the TV program.

When an interactive record setting method using keyword search is employed, an event can be avoided that the originator mistakenly understands a channel number causing erroneous setting to record the TV broadcast.

In a case where a capacity of the memory (ROM 104) mounted in the portable cellular phone 1 is not enough to record the TV broadcast designated by the user, this information may be fed to the originator. This can be achieved by installing a program for calculating a predicted necessary capacity based on information about TV broadcast time designated by the originator, recording quality, or a like and comparing the resulting capacity with available memory space in the portable cellular phone 1.

The user of the portable cellular phone 1 having received a notification that there is not enough memory may be allowed to operate the portable cellular phone 1 to designate a memory region that can be overwritten.

There are various variations in operations of the portable cellular phone 1 being in a record mode of recording the TV broadcast (program). For example, in a case in which voice codec and record processing cannot be performed in parallel due to a limitation of processing capability of the CPU 102, a method is employed in which, when the portable cellular phone 1 receives the incoming call, the unattended telephone function is started immediately without performing call-receipt processing 23. This enables an amount of processes of the CPU 102 required for the call-receipt processing 23 to be reduced.

Conversely, when the incoming call is received, processing of recording the TV broadcast may be stopped or discontinued by assigning a priority to the call-receipt processing 23. Operations performed while the TV broadcast is being recorded may be preset by the portable cellular phone 1.

In addition, by mounting two CPUs, processing may be distributed in parallel to improve a total processing capability.

If no problem occurs in terms of processing capability of the CPU 102, while processing of recording the TV broadcast is being performed, a series of processing required in ordinal call-receipt processes can be performed.

In the TV video record processing section 109, signal compression processing of the TV broadcast data can be performed. When the signal is compressed, the TV broadcast data can be accumulated by using a smaller amount of memory (ROM 104), which is helpful for setting to record the TV broadcast.

Second Embodiment

Figure 8:
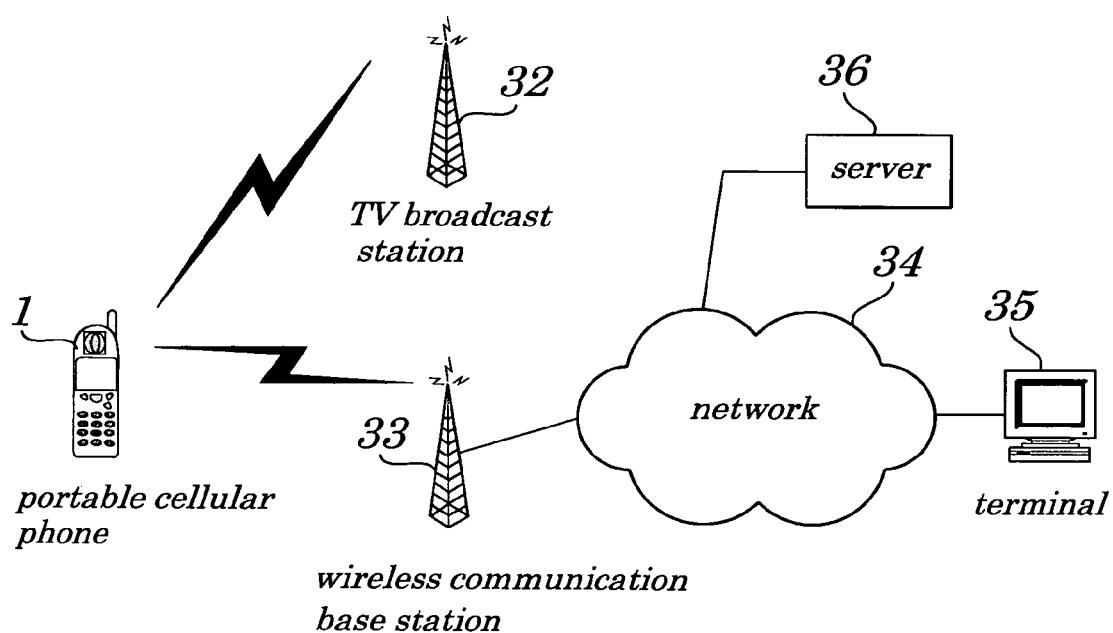
FIG. 8 is a diagram illustrating an entire system in which a portable cellular phone having a capability of receiving a TV broadcast is operated by remote control according to a second embodiment of the present invention.

FIG. 8 is a diagram illustrating an entire system in which a portable cellular phone having a capability of receiving a TV broadcast is operated by remote control according to a second embodiment.

The portable cellular phone 1 is connected to a TV broadcast station 32 and a wireless communication base station 33 via wireless communication. The wireless communication base station 33 is connected over a network 34 to a terminal 35. The network 34 is connected to a server 36. In this system, the terminal 35 transmits information over the network 34 to the portable cellular phone 1 or the server 36.

The portable cellular phone 1 is one having a capability of receiving the TV broadcast of the present invention and can be set to record the TV broadcast according to a record setting signal to be fed from outside.

The TV broadcast station 32 is a wireless base station to transmit a digital or analog TV broadcast radio wave. The wireless communication base station 33 is a wireless base station to transmit or receive a wireless signal to carry out voice or data communication with the portable cellular phone 1.

The network 34 is a public circuit network for a telephone. When a telephone network is realized by VoIP (Voice over IP) technology, the network 34 is an IP (Internet Protocol) network. Moreover, over this network 34, data communication, besides voice communication, can be carried out.

The terminal 35 is an information terminal on which a WEB browser is installed including a PC, portable cellular phone, PDA (Personal Digital Assistant), or a like. The terminal 35 can be connected to the server 36 using its WEB browser.

The server 36 is a WEB server that acts as an intermediary for data communication between the portable cellular phone 1 and the terminal 35. The server 36 has a capability of transmitting information to the portable cellular phone 1 according to input data fed from the terminal 35 and of displaying the information on a WEB page according to information received from the portable cellular phone 1.

Configurations of the portable cellular phone 1 of the second embodiment are the same as those in the first embodiment and, therefore, their descriptions are omitted to avoid redundancy.

Figure 12:
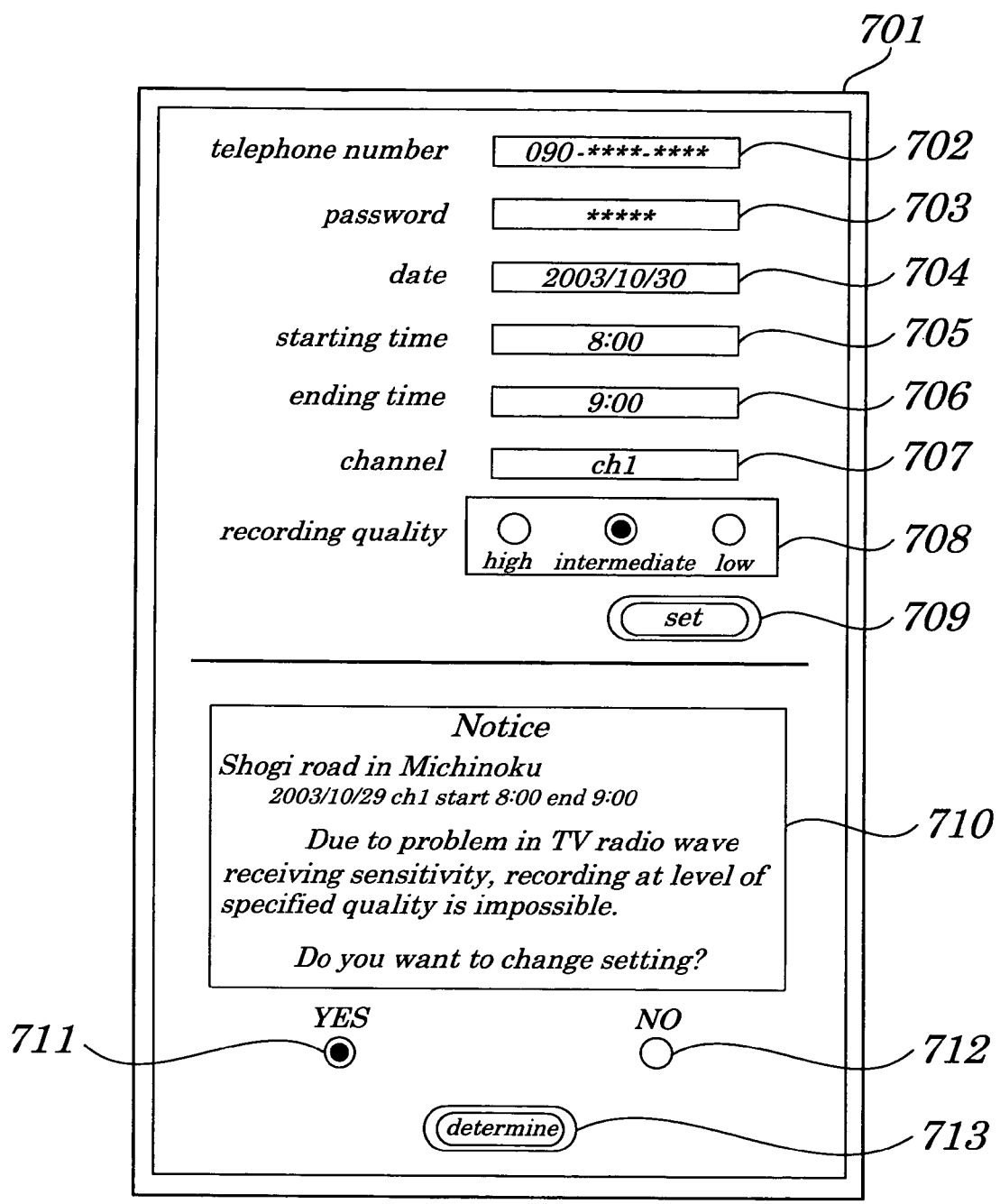
FIG. 12 is also a diagram illustrating still yet another WEB page provided by the server of the second embodiment of the present invention.
Figure 13:
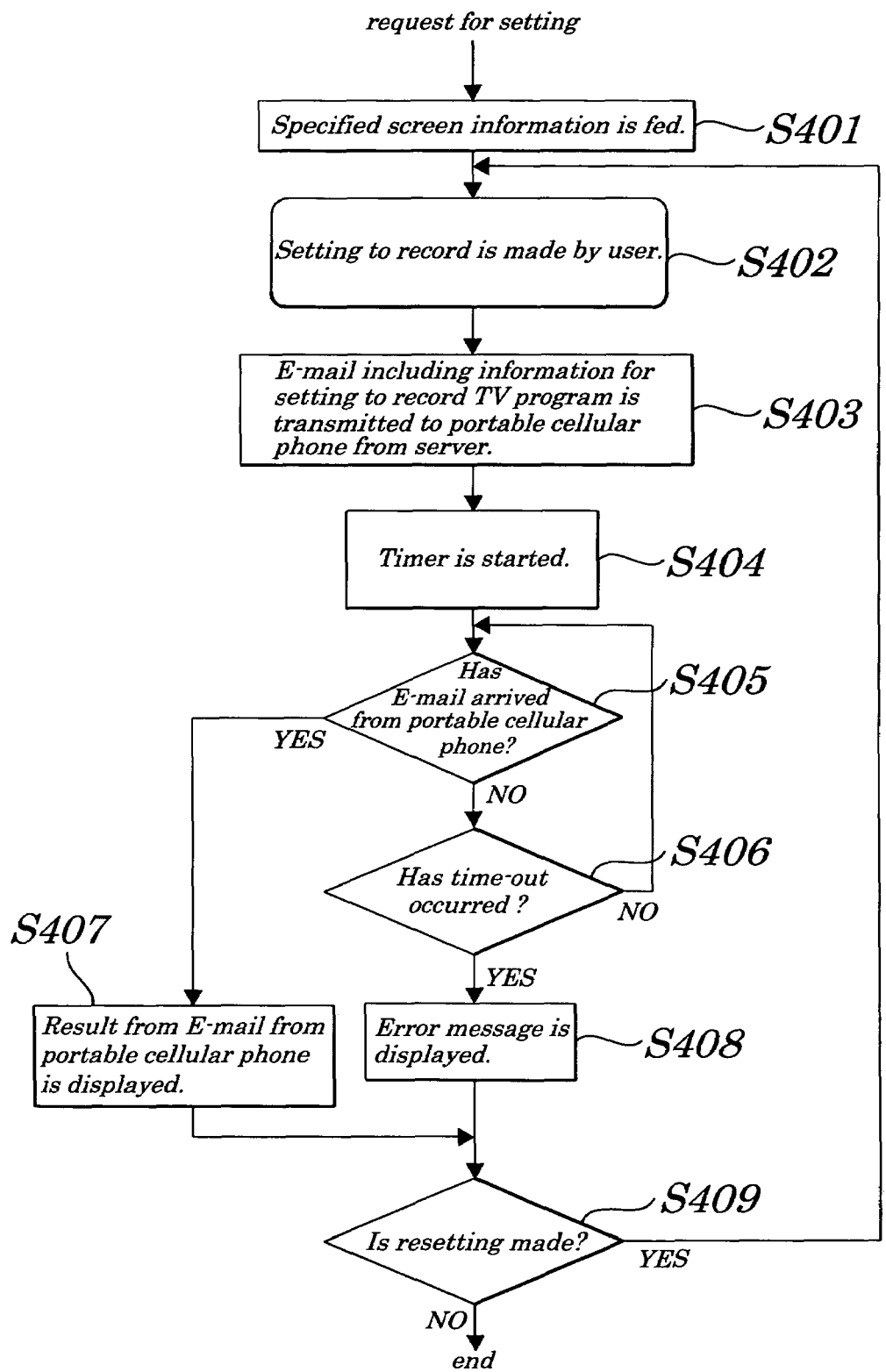
FIG. 13 is a flowchart explaining procedures performed by the server to set the portable cellular phone to record the TV broadcast according to the second embodiment of the present invention.
Figure 14:
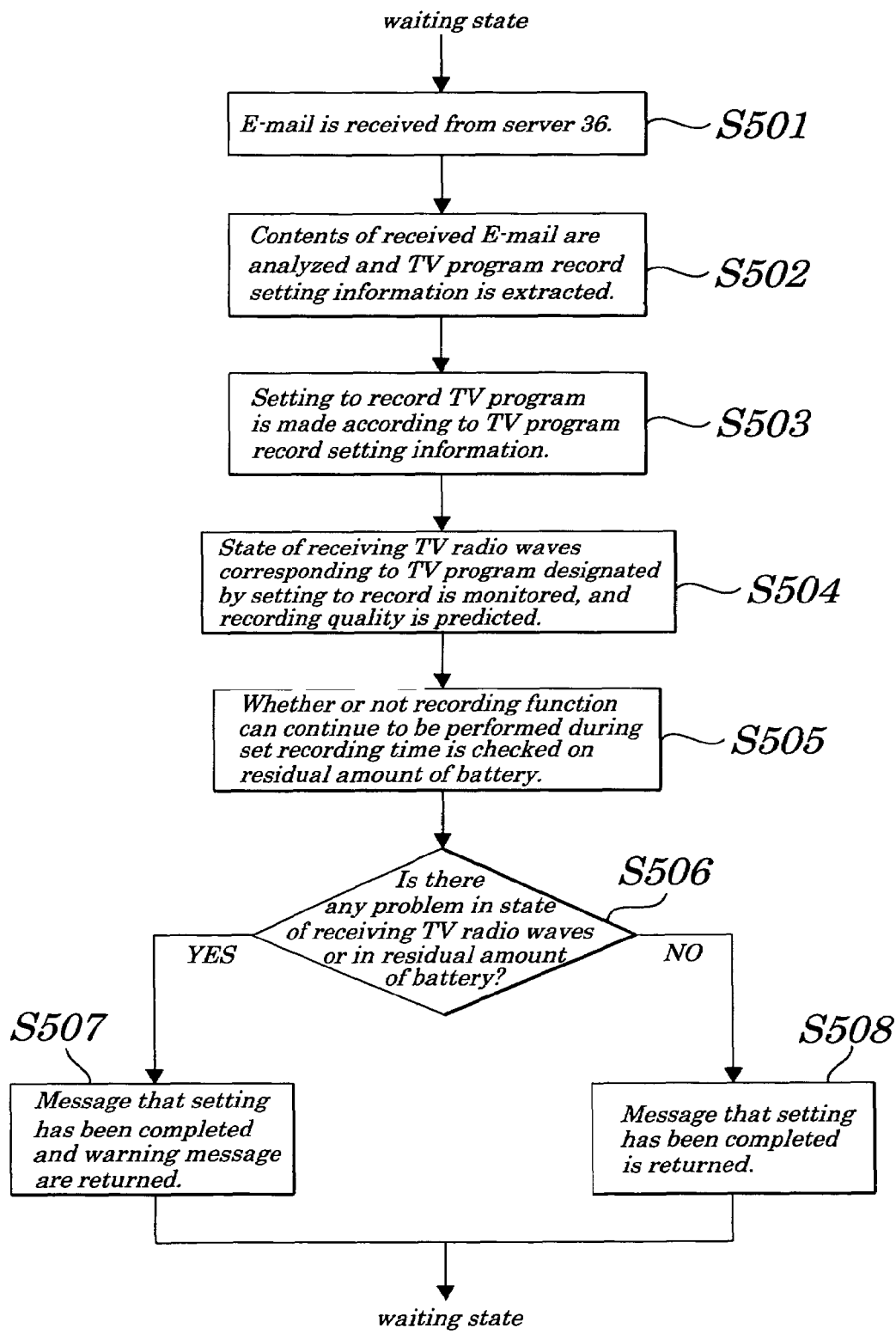
FIG. 14 is a flowchart explaining procedures performed by the portable cellular phone to be set to record the TV broadcast according to the second embodiment of the present invention.

Operations of the system of the second embodiment are described by referring to FIG. 13 which shows a flowchart explaining operations of the server 36 and to FIG. 14 which shows a flowchart explaining operations of the portable cellular phone 1. The operations are described also with reference to FIG. 9 to FIG. 12 which show images for operations.

A user of the portable cellular phone 1, having a capability of receiving the TV broadcast being in a remote site, connects the portable cellular phone 1 to the server 36 by using the terminal 35. Connection is set up over the network 34. The server 36 feeds a HTML (Hyper Text Markup Language) file to make a screen for a TV program record setting appear on the terminal 35 to the terminal 35 (Step S401 in FIG. 13).

Figure 9:
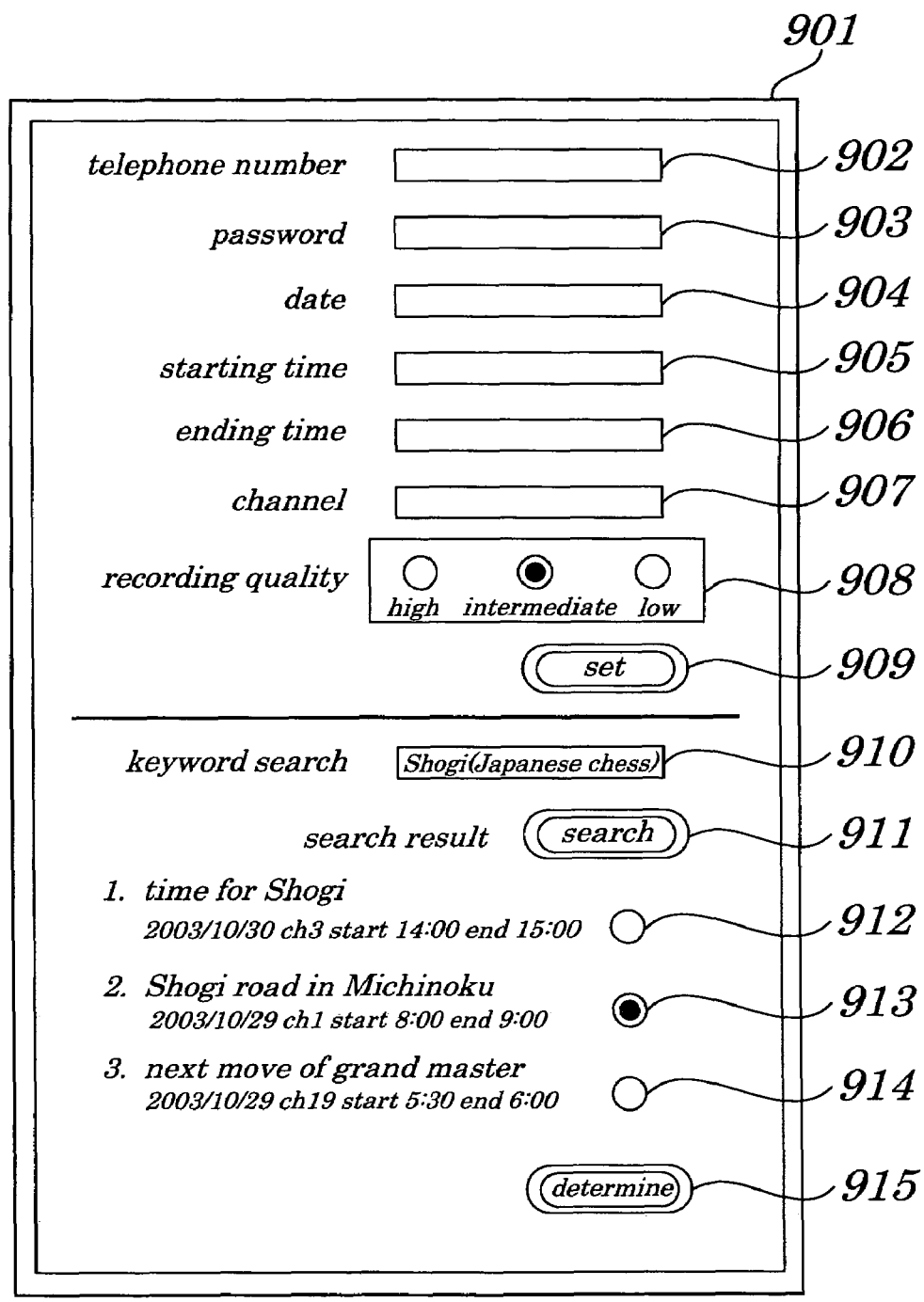
FIG. 9 is a diagram illustrating a WEB page provided by a server of the second embodiment of the present invention.

Next, the user of the portable cellular phone 1 makes setting to record the TV broadcast by using a TV program record setting screen 901 appearing on the terminal 35 (Step S402). This step is performed by the user. FIG. 9 shows an example of the TV program record setting screen 901. The set screen 901 is a WEB page.

The user of the portable cellular phone 1 inputs a telephone number 902 of the portable cellular phone 1, password 903 preset in order to prevent an unauthorized person other than the user from making setting the portable cellular phone 1 to record the TV program, a date 904 of a desired TV program, a broadcast starting time 905, a broadcast ending time 906, a channel number 907, a desired recording quality 908 and, if the input contents are correct, clicks a "SET" button 909. The user clicks the "SET" button 909 by using an input device of the terminal 35 such as a mouse, track ball, or a like. This instructs the server 36 to make setting to record the TV program.

The user, if having no information about a date of the TV program to be recorded, broadcast starting time, broadcast ending time, channel number, or a like, can use a "keyword search" column 910. Program related information about a performer, program title, genre, or a like can be input in the "keyword search" column 910 on the TV program record setting screen 901. After a keyword has been input in the "keyword search" column 910, when a keyword search button 911 is clicked, the server 36 searches for the TV program.

TV program information may be accumulated, in advance, in the server 36 over the network 34 or may be searched for, from another server (not shown), according to an operation of clicking the keyword search button 911 over the network 34.

After completion of keyword search, a search result is displayed on the WEB page 901 and selection boxes 912, 913, and 914 appear on the WEB page 901. In the embodiment, three selection boxes are used, however, more than three or less than three selection boxes may be used.

Figure 11:
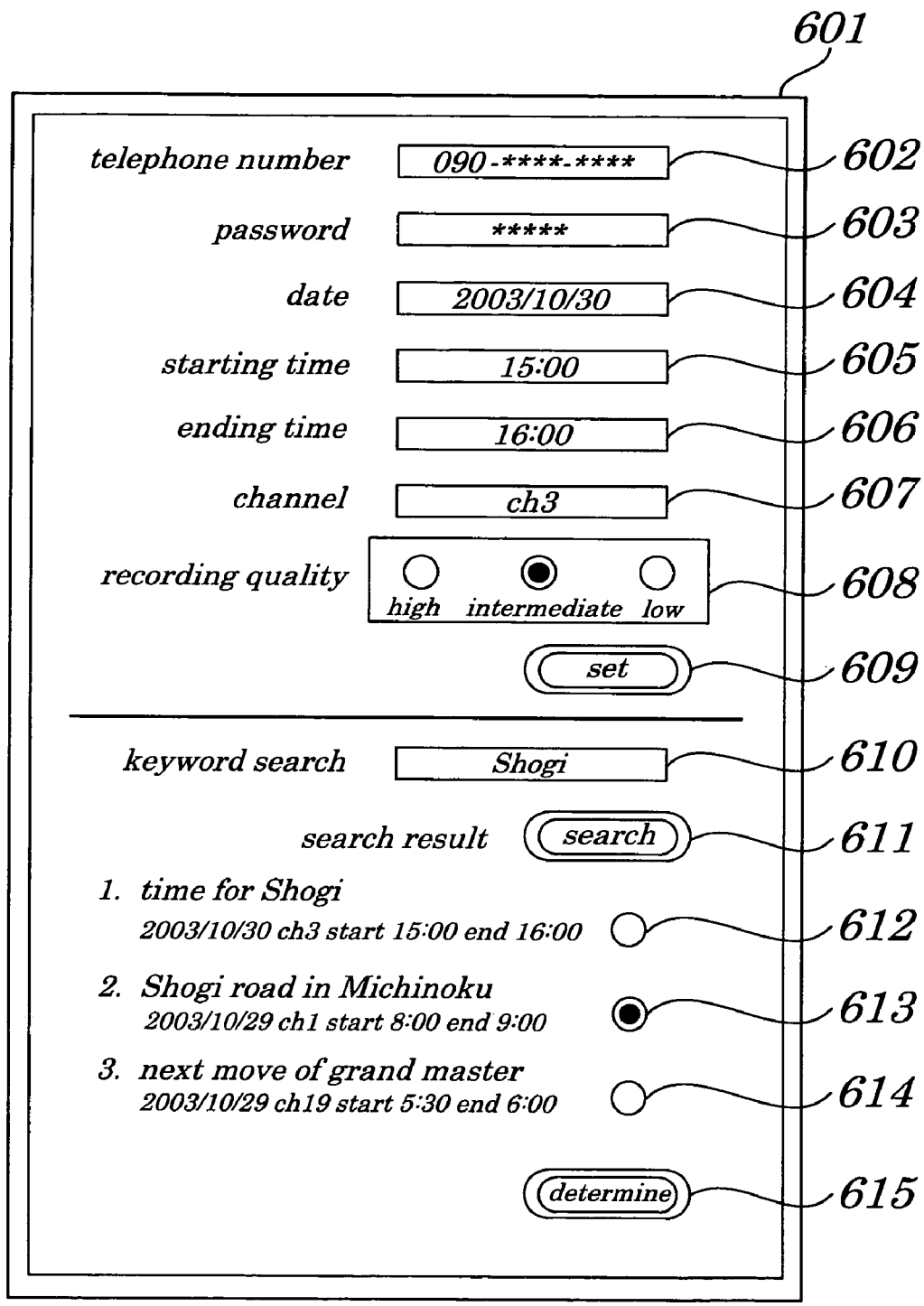
FIG. 11 is also a diagram illustrating yet another WEB page provided by the server of the second embodiment of the present invention.

The user can save some work of manually inputting information into a "date" column 904, "starting time" column 905, "ending time" column 906, and "channel" column 907 by checking a button corresponding to a desired program selected from the selection buttons and clicking a "DETERMINE" button 915. That is, as shown in FIG. 11, the information such as a broadcast starting date of the TV program selected from a result of the keyword search appears in each of the determining columns 603, 604, 605, 606, and 607. When the user selects recording quality required when the TV broadcast is recorded and clicks the SET button 609, inputting of information for setting to record the TV broadcast is completed.

After the inputting of the information for setting to record the TV broadcast has been completed, the server 36 formats the information by encrypting the information or by using other methods so as to have an E-mail style and transmits the E-mail (including information for settings to record TV program) to the portable cellular phone 1 (Step S403 in FIG. 13). After transmission of the E-mail, the server 36 starts a timer (not shown) (Step S404), which is mounted in the server 36, to measure time. The timer may be provided in a form of hardware or in a form of software. The timer is set for predetermined time. The timer, until this time elapses, checks whether or not there is an answer from the portable cellular phone 1 (Steps S405 and S406). The answer from the portable cellular phone 1 includes information informing that the portable cellular phone 1 has received a signal for setting to record the TV broadcast and/or information about a state of a radio wave being used by the portable cellular phone 1. It is preferable that the information is transmitted by E-mail.

If there is no answer from the portable cellular phone 1 within a specified time, the server 36 displays an error message to the terminal 35 (Step S408).

If there is an answer from the portable cellular phone 1 within the specified time, the server 36 displays a result from the answer from the portable cellular phone 1 on the WEB page (Step S407).

FIG. 12 shows an example of the displayed result. On a WEB page 701 is displayed, together with various information including a telephone number 702, password 703, date 704, starting time 705, ending time 706, channel 708, and recording quality 708 as they are when setting for recording was made, an answering message 710 from the portable cellular phone 1. In the embodiment, the answering message 710 "due to a problem in TV radio wave receiving sensitivity, recording at a level of specified quality is impossible" is displayed.

In a case where contents of the TV program record setting are not changed without the quality being not ensured, the user selects a "NO" button 712 and, in a case where contents of the TV program record setting are changed, selects a "YES" button 711. If the "NO" button 712 is selected, the TV program record setting is not changed and the portable cellular phone 1 records the TV program according to the TV program record setting. If the "YES" button 711 is selected, a user can again make setting for recording the TV program (Step S409 in FIG. 13).

Next, operations of the portable cellular phone 1 are described by referring to FIG. 14. E-mail transmitted from the server 36 is fed to the portable cellular phone 1 over the network 34 and via the wireless communication base station 33.

The portable cellular phone 1 receives E-mail containing information about the TV program record setting from the server 36 (Step S501). The portable cellular phone 1 has a capability of performing E-mail, besides the capability of carrying out a conversation, and can receive E-mail via a telephone antenna 113 (FIG. 2).

The portable cellular phone 1 analyzes contents of received E-mail and extracts TV program record setting information (Step S502). More specifically, by making a program stored, in advance, in a ROM 104 run by using a CPU 102, the TV program record setting information is extracted by a call originating and receiving processing section 112 from data of data-converted E-mail.

Setting to record the TV program is made according to the extracted TV program record setting information (Step S503) Date of an extracted TV program, record starting time, or a like are accumulated in the ROM 104 in a specified format. When recording time to start comes, by a program installed by the portable cellular phone 1, recording of the TV program is started exactly as preset to record.

The portable cellular phone 1 monitors a level state of receiving the TV radio wave corresponding to the TV program designated by setting to record and predicts recording quality (Step S504). The information about the TV program record setting includes a channel number. A level of a signal corresponding to the channel and a degree of signal degradation are measured via the telephone antenna 113. From the result from this measurement, quality of an image obtained by recording the set TV program is predicted and a difference between the predicted quality and set recording quality is calculated. The result from the calculation is stored temporarily in the ROM 104, RAM 105 or in a register in the CPU 102 and then is returned back to the server 36.

The portable cellular phone 1 calculates a remaining amount of a battery by using a voltmeter (not shown) or an ampere meter (not shown) (Step S505). Power required to record the TV broadcast is calculated from an amount of consumption of power required to drive a circuit which has been stored, in advance, in the ROM 104 and recording time extracted from the TV broadcast record setting information. An amount of power consumption obtained from the calculation is compared with the amount of consumption of power that the battery can supply and the result from the comparison is stored in the ROM 104, RAM 105, or in the register in the CPU 102.

Whether or not the TV program can be recorded as exactly designated by the TV program record setting information is judged from a level state of receiving TV radio waves and the remaining amount of battery (Step S506). This judgement is made based on a predetermined reference value (error rate of receiving TV broadcast signals or error correcting rate for TV broadcast signals, results from the comparison between possible power consumption calculated based on the battery voltage and an amount of consumption of power required to record the TV broadcast).

When recording as exactly designated by the TV program record setting information is judged to be difficult, a message that setting for recording is completed according to the designated TV program record setting information and that recording as exactly designated by the TV program record setting information is difficult and its reason are transmitted to the server 36 by E-mail (Step S507). The message is transmitted by the call originating and receiving processing section 112 to the wireless communication base station 33 via the telephone antenna 113.

When recording as exactly designated by the TV program record setting information is judged to be not difficult, a message that record setting has been completed based on the designated TV program record setting information is transmitted to the server 36 by E-mail (Step S508). The information is transmitted by the call originating and receiving processing section 112 to the wireless communication base station 33 via the telephone antenna 113.

After that, the operating state of the portable cellular phone 1 is changed to the waiting state. Now, the setting to record the TV broadcast is complete.

It is apparent that the present invention is not limited to the above embodiments but may be changed and modified without departing from the scope and spirit of the invention. For example, in the above embodiment, TV program information is searched for by using the keyword search, however, the present invention is not limited to this, that is, as shown in FIG. 10, a TV program table 810 may be displayed on a WEB page 801.

The TV program table 810 displays the TV program by using a date and time at which the user of the portable cellular phone 1 browsed the WEB page 801. The TV program table 810 is a TV broadcast schedule table created for every three hours and, if all tables cannot be displayed, scrolling bars 812 and 815 are displayed to show only part of the TV program table 810. The user can display portions being not displayed out of the TV program table 810 by scrolling the scrolling bars (812, 815). When a desired program is not contained in the TV program table 810 being now displayed, the user can search for a desired program by clicking a "Previous Day" button 806, "Next Day" button 807, "Previous Three Hour" button 808, and "Next Three Hour" button 809. A selection region 813 is a region where the TV program to be set for recording is selected. The user can select the TV program by using an input device such as a mouse, track ball on the terminal 35, or a like.

Figure 10:
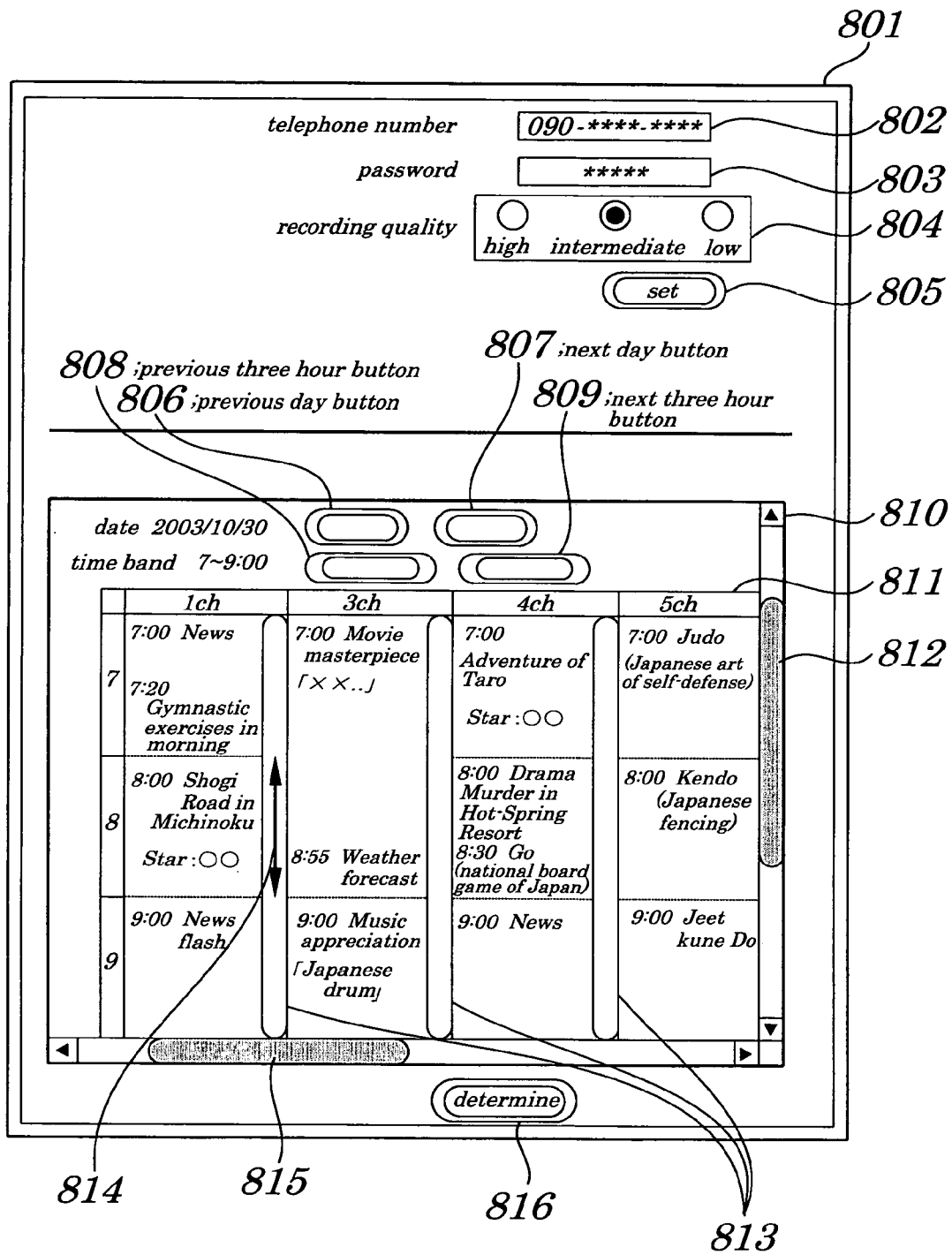
FIG. 10 is also a diagram illustrating another WEB page provided by the server of the second embodiment of the present invention.

For example, in FIG. 10, by putting a cursor in the selection region 813 corresponding to a portion from a time period (slot) 8:00 to 9:00 for a right side of a program of "Shogi (Japanese chess) road in Michinoku" and by dragging the mouse or the like, an arrow 814 appears. By clicking the "DETERMINE" button 816, the TV program can be selected.

The TV program table created for every region may be selected. For example, by mounting a button that allows the user to select a region such as Tokyo Metropolis, Osaka Prefecture, or a like on the WEB page 801, the user may select any region for which the TV program is available. Thus, the TV program corresponding to the selected region is displayed.

The region for which the TV program is available may be specified by automatically searching for a present position of the portable cellular phone 1. Generally, a system of a portable cellular phone has a database to manage a present position of a terminal which is used for invoking a function of the terminal.

In a case where the server 36 is authorized to search for the database, by searching for the database, it is made possible to specify the present position of the portable cellular phone 1 and to display the TV program table 810 corresponding to the selected region.

The accuracy for the present position of the portable cellular phone 1 specified by the above method is approximately within a radio wave propagation range in the single wireless communication base station 33. Therefore, there is a case where, within the above radio wave propagation range, a plurality of TV programs can be applied and there may be a case where the TV program table 810 used by the server 36 does not match to a TV program table 810 available in the present position of the portable cellular phone 1.

To avoid this situation, the portable cellular phone 1 downloads, in advance, the TV program table 810 having matched to the TV program table 810 available in its present position and judges whether TV program information designated by the server 36 matches to the downloaded TV program information. If there is no matching, that information is to be notified to the server 36. In this case, the specified TV program information may be amended so as to have information about a program corresponding to the downloaded TV program information.

Moreover, the TV program table 810 may be downloaded via the telephone antenna 113 or the TV radio wave receiving antenna 108 periodically or every time setting to record the TV broadcast is made. If the telephone antenna 113 is used, the TV program table 810 may be downloaded by using service provided by the Internet or portable cellular phone company. In a case where the TV program table 810 is broadcast together with the TV broadcast, the TV program table 810 may be downloaded via the TV radio wave receiving antenna 108.

To download the TV program table 810 available in the present position of the portable cellular phone 1, information about the position of the portable cellular phone 1 obtained from a position of a base station to which a communication area of the portable cellular phone 1 belongs is used and, if the portable cellular phone 1 has a capability of using a GPS, information about a position obtained by using the GPS is used. Based on the TV radio wave receiving sensitivity of the portable cellular phone 1, the TV program table 810 being most suitable to receiving the TV radio wave is searched for, selected and downloaded. The downloaded TV program table 810 is accumulated in the ROM 104 or a like.

In a case where a password input on the WEB page 401 or a like is different from that assigned in advance, a record setting signal is not transmitted to the portable cellular phone 1 and a "password" column may be changed to a blank accordingly. In this case, a warning message informing that the password is different may be displayed on the WEB page 401.

The recording quality is determined by a screen size, frame rate, or a like. In FIGS. 9 to 12, the recording quality (608, 708, 804, 908) is represented in three levels including a high, intermediate, and low level. The quality level is not limited to this example and a screen size, frame rate, or a like may be used individually as an item for evaluation of the recording quality.

As the terminal 35, electronic devices being connectable to a PC, portable cellular phone, PDA, or a like may be used.

In the above embodiment, setting to record the TV broadcast is made via the server 36, however, presetting to record the TV broadcast may be made by using the portable cellular phone 1 as a server and by making the terminal 35 directly be connected to the portable cellular phone 1 over the network 34. For example, the portable cellular phone 1 may have an IP address so as to serve as the server 36 described in the embodiment. As a result, the user of the portable cellular phone 1 can preset the portable cellular phone 1 to record the TV broadcast via the terminal 35 in a direct and interactive manner.

TV program record setting information may be transmitted by E-mail directly from the terminal 35 to the portable cellular phone 1. When information about a warning message based on the level state of receiving radio waves, remaining amounts of the battery, or the like, or information notifying that the setting to record the TV broadcast has been complete is transmitted by E-mail from the portable cellular phone 1 to the terminal 35, as in the case of the embodiments, the user can confirm the setting state, which is helpful to make the setting to record the TV broadcast.

In the above embodiments, the server 36 transmits TV program record setting information, by E-mail, to the portable cellular phone 1, however, the present invention is not limited to this. That is, data communication other than communication using E-mail may be employed to transmit the TV program record setting information. For example, when a provider of the portable cellular phone system manages the server 36, the TV program record setting information may be transmitted in a manner in which the TV program record setting information is contained in a pilot signal being essential to the portable cellular phone system or in a portable cellular phone calling signal.

In the above embodiments, if the portable cellular phone 1 cannot be connected to the server 36 due to reasons that the portable cellular phone 1 cannot receive radio waves from the wireless communication base station 33 or that the portable cellular phone 1 has no power, or a like, a warning message informing that the server 36 cannot communicate with the portable cellular phone 1 may be displayed on the WEB page to notify the message to the user trying to make setting to record the TV broadcast.

In the present invention, variations described in the first embodiment can be applied to the second embodiment and variations described in the second embodiment can be applied to the first embodiment.

What is claimed is:

1. A portable cellular phone comprising:
   a wireless communication unit;
   a TV (Television) broadcast receiving unit to receive a TV broadcast;
   a TV broadcast record setting unit to make record settings of the TV broadcast according to a record setting signal received via said wireless communication unit;
   a TV broadcast recording unit to record the TV broadcast in accordance with the record settings of the TV broadcast; and
   a record settings storing unit to store the record settings of the TV broadcast, and
   wherein, when a level state of receiving a TV radio wave is under a predetermined reference level, information based on the level state of receiving the TV radio wave is transmitted via said wireless communication unit.

2. The portable cellular phone according to claim 1, wherein information about a remaining amount of a battery or information about recorded memory is transmitted via said wireless communication unit.

3. The portable cellular phone according to claim 1, further comprising, when the level state of receiving the TV radio wave is under a predetermined reference level, another TV broadcast receiving unit to receive the TV broadcast via said wireless communication unit, instead of or together with said TV broadcast receiving unit.

4. The portable cellular phone according to claim 1, further comprising a wireless communication antenna for said wireless communication unit and a TV radio wave antenna for said TV broadcast receiving unit provided respectively in a separated manner.

5. The portable cellular phone according to claim 1, further comprising a shared antenna used in common for said wireless communication unit and for said TV broadcast receiving unit.

6. The portable cellular phone according to claim 1, further comprising a plurality of antennas used for said wireless communication unit and for said TV broadcast receiving unit, whereby the TV broadcast is received in a diversity receiving way.

7. The portable cellular phone according to claim 1, further comprising a record stopping unit to stop or discontinue recording of the TV broadcast when an incoming call is received while the TV broadcast is being recorded.

8. The portable cellular phone according to claim 1, further comprising a function activating unit to activate an unattended answering function when an incoming call is received while the TV broadcast is being recorded.

9. The portable cellular phone according to claim 1, wherein said TV broadcast recording unit is configured such that the TV broadcast signal is code-converted and then recorded.

10. The portable cellular phone according to claim 1, wherein said record setting signal contains a signal for record starting time and a signal for record ending time.

11. The portable cellular phone according to claim 1, wherein said record setting signal contains a TV broadcast recording instruction signal to instruct said TV broadcast recording unit to record the TV broadcast.

12. The portable cellular phone according to claim 1, wherein said TV broadcast record setting unit analyzes said record setting signal and makes the record settings of the TV broadcast, according to program schedule information received via said wireless communication unit or said TV broadcast receiving unit.

13. The portable cellular phone according to claim 1, wherein said record setting signal contains program related information.

14. The portable cellular phone according to claim 1, wherein said record setting signal contains information that designates a region to be erased in recorded memory of the TV broadcast.

15. The portable cellular phone according to claim 1, wherein said record setting signal is made up of a push-sound signal generated and transmitted by pressing down at least one specified dial key.

16. The portable cellular phone according to claim 1, wherein said record setting signal is in an E-mail format.

17. The portable cellular phone according to claim 1, wherein said record setting signal contains a password.

18. The portable cellular phone according to claim 1, wherein, said information based on a level state of receiving the TV radio wave, information about a remaining amount of a battery, or information about record memory, after said record setting signal has been received, is transmitted via said wireless communication unit.

19. The portable cellular phone according to claim 1, further comprising a memory,
wherein recordings made by said TV broadcast recording unit are saved into said memory of said portable cellular phone.

20. The portable cellular phone according to claim 1, wherein said record setting signal received by said portable cellular phone is received from another portable cellular phone.

21. A TV broadcast record setting method for a portable cellular phone having capability of receiving TV (Television) broadcast, said method comprising:
a step of receiving a record setting signal via a wireless communication unit,
a step of analyzing the received record setting signal to make a record settings of the TV broadcast,
a step of storing the made record settings of the TV broadcast; and
a step of recording the TV broadcast in a memory according to the stored record settings of the TV broadcast.

22. The TV broadcast record setting method according to claim 21, wherein the information about a level state of receiving a TV radio wave, information about a remaining amount of a battery, or information about the recorded memory is transmitted via said wireless communication unit.

23. A TV broadcast record setting system for a portable cellular phone comprising: a terminal, a server, a wireless base station, a TV (Television) broadcast station, a portable cellular phone; and a network,
wherein said terminal provides said server over said network with a first information to designate said portable cellular phone, a second information required to use said portable cellular phone, and a third information about TV program;
wherein said server produces a record setting signal based on the first information, the second information, and the third information, and transmits the produced record setting signal over said network and via said wireless base station to said portable cellular phone; and
wherein said portable cellular phone makes record settings of the TV broadcast according to the received record setting signal.

24. A portable cellular phone comprising:
a wireless communication means;
a TV (Television) broadcast receiving means to receive a TV broadcast;
a TV broadcast record setting means to make record settings of the TV broadcast according to a record setting signal; and
a TV broadcast recording means to record the TV broadcast in accordance with the record settings of the TV broadcast.

25. The portable cellular phone according to claim 24, wherein said record setting signal is received via said wireless communication means.

26. The portable cellular phone according to claim 24, further comprising a record settings storing means to store the record settings of the TV broadcast.

27. The portable cellular phone according to claim 24, wherein information about a remaining amount of a battery or information about recorded memory is transmitted via said wireless communication means.

28. The portable cellular phone according to claim 24, wherein, when a level state of receiving a TV radio wave is under a predetermined reference level, information based on the level state of receiving the TV radio wave is transmitted via said wireless communication means.

* * * * *